United States Patent [19]
Ishii

[11] Patent Number: 6,132,012
[45] Date of Patent: Oct. 17, 2000

[54] ABNORMAL CONDITION DETECTING APPARATUS AND SAFETY APPARATUS FOR HYDRAULIC BRAKE BOOSTING SYSTEM

[75] Inventor: Tomoyuki Ishii, Higashimatsuyama, Japan

[73] Assignee: Jidosha Kiki Co., Ltd., Tokyo, Japan

[21] Appl. No.: 09/103,937

[22] Filed: Jun. 25, 1998

[30] Foreign Application Priority Data

Jul. 23, 1997 [JP] Japan .................................. 9-197121

[51] Int. Cl.$^7$ ...................................................... B60T 8/88
[52] U.S. Cl. ............................... 303/122.12; 303/122.09; 303/122.1
[58] Field of Search ........................... 303/122.09, 122.1, 303/122.12, 11, 57, DIG. 3, DIG. 11

[56] References Cited

U.S. PATENT DOCUMENTS

| | | | |
|---|---|---|---|
| 4,872,732 | 10/1989 | Stegmaier | 303/110 |
| 5,413,404 | 5/1995 | Inagawa | 303/92 |
| 5,733,017 | 3/1998 | Nakishima et al. | 303/10 |
| 5,779,327 | 7/1998 | Nakishima et al. | 303/122.1 |
| 5,954,406 | 9/1999 | Sawada | 303/122.09 |
| 6,007,163 | 12/1999 | Sawada | 303/122.09 |
| 6,019,438 | 2/2000 | Sawada et al. | 303/113.4 |

FOREIGN PATENT DOCUMENTS 7-33002  2/1995  Japan .............................. B60T 13/14

Primary Examiner—Robert J. Oberleitner
Assistant Examiner—Devon Kramer
Attorney, Agent, or Firm—Sughrue, Mion, Zinn, Macpeak & Seas, PLLC

[57] ABSTRACT

If a determination is made by a pressure gradient comparison means 24 that gradient of the rise in the pressure in an accumulator calculated by a pressure gradient calculating means 21 and realized during the operation of a pump is lower than a predetermined level, occurrence of an abnormal condition of the pump or a motor is determined. If a pressure gradient comparison means 24 determines that the gradient of pressure depression of the hydraulic pressure in the accumulator realized after the operation of the pump has been interrupted is higher than a predetermined value, occurrence of an abnormal condition which is leakage of solution is determined. If determination of the abnormal condition is sequentially made predetermined number of times, an abnormal-condition deciding means 28 decides occurrence of an abnormal condition, and then produces an output to an alarm-signal generating means 29.

11 Claims, 28 Drawing Sheets

FIG. 3A

| PRESSURE P | SET VALUE α | PRESSURE P | SET VALUE β |
|---|---|---|---|
| $P < P\alpha1$ | A | $P < P\beta1$ | a |
| $P\alpha1 \leqq P < P\alpha2$ | B | $P\beta1 \leqq P < P\beta2$ | b |
| $P\alpha2 \leqq P < P\alpha3$ | C | $P\beta2 \leqq P < P\beta3$ | c |
| ... | ... | ... | ... |

($A<B<C<\cdots; a<b<c<\cdots$)

FIG. 3B

| PRESSURE P | SET VALUE α | PRESSURE P | SET VALUE β |
|---|---|---|---|
| $P < P\alpha1$ | A | $P < P\beta1$ | a |
| $P\alpha1 \leqq P$ | B | $P\beta1 \leqq P$ | b |

($A<B; a<b$)

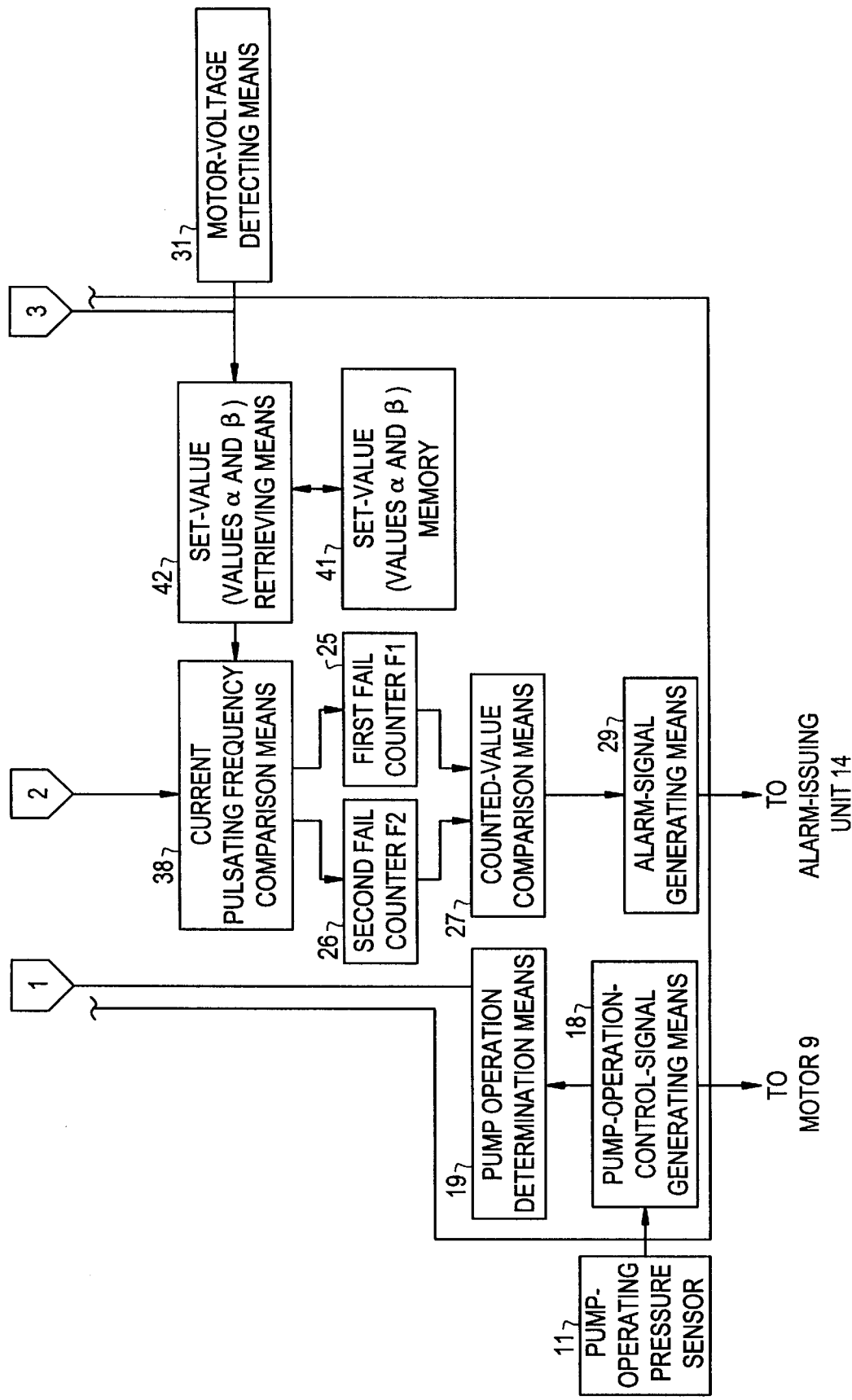

ABNORMAL CONDITION DETECTING APPARATUS AND SAFETY APPARATUS FOR HYDRAULIC BRAKE BOOSTING SYSTEM

BACKGROUND OF THE INVENTION

1. Field of the Invention

The present invention relates to a technical field of a hydraulic brake boosting system for boosting depressing force applied to a brake pedal of, for example, an automobile, with power generated by hydraulic pressure of operating fluid so as to enlarge braking force, and more particularly to an abnormal condition detecting apparatus for a hydraulic brake boosting system for detecting an abnormal condition of a pump-operation-control apparatus for operating and controlling a pump for generating hydraulic pressure of the operating fluid and restraining the driving speed if an abnormal condition is detected.

2. Description of the Related Art

Brake boosting systems for vehicles, for example, automobiles, include a hydraulic brake boosting system which incorporates a hydraulic brake boosting apparatus for boosting the force for depressing a brake pedal so as to enlarge the braking force. The hydraulic brake boosting system enables great braking force which cannot be obtained from only the depressing force which is applied to the brake pedal. Moreover, the force for depressing the pedal can be reduced.

An hydraulic brake boosting system of the foregoing incorporates a pump which is operated by a motor so as to generate hydraulic pressure of the operating fluid and an accumulator for accumulating the generated hydraulic pressure. When the brake pedal has been depressed, the hydraulic pressure accumulated in the accumulator is introduced into the hydraulic brake boosting apparatus. Thus, the hydraulic brake boosting apparatus produces an output obtained by boosting the depressing force applied to the pedal in accordance with the depressing force. The thus-produced output causes a master cylinder to be operated.

The above-mentioned brake boosting system has a necessity that hydraulic pressure of a predetermined level can assuredly be introduced into the hydraulic brake boosting apparatus when the brake is operated. Therefore, the operation of the pump must be controlled in such a manner that predetermined hydraulic pressure is always accumulated in the accumulator.

An alarm-issuing apparatus for a conventional pump operation control apparatus for controlling the operation of the pump as described above has been disclosed in Japanese Patent Laid-Open No. 7-33002. According to the disclosure, a pump-operating pressure sensor (or a pressure sensor which is hereinafter and representatively called a "pressure sensor") is employed to hydraulic pressure accumulated in the accumulator. When the hydraulic pressure accumulated in the accumulator has been raised to a level with which the pump must be operated, the pump is operated to raise the hydraulic pressure accumulated in the accumulator. Moreover, an alarm-issuing pressure sensor is employed to detect and issue an alarm when the hydraulic pressure accumulated in the accumulator has abnormally been reduced.

The alarm-issuing apparatus disclosed as described above is arranged to issue an alarm when the hydraulic pressure accumulated in the accumulator has been made to be lower than a predetermined level. Moreover, an alarm delay circuit is provided to prevent a malfunction so as to prevent incorrect issue of an alarm when a vehicle allowed to stand for long time is started in a state in which the hydraulic pressure accumulated in the accumulator is at a low level.

However, the above-mentioned alarm-issuing unit disclosed as described above is arranged such that an alarm is issued only after the hydraulic pressure accumulated in the accumulator has been made to be lower than a predetermined level. Therefore, the alarm-issuing pressure sensor is not operated if the hydraulic pressure accumulated in the accumulator is not lower than the predetermined level. Thus, an abnormal condition of the pump, the motor or the sensor cannot be detected. Moreover, when an alarm has been issued from the alarm-issuing pressure sensor and thus an abnormal condition of the pump, the motor or the sensor has been detected, the hydraulic pressure accumulated in the accumulator has been reduced. Therefore, there is apprehension that the braking force becomes insufficient when the vehicle is driven at high speed or on a slope.

Moreover, the characteristics of the pressure sensor are sometimes changed because of deterioration or the like. If the characteristics of the pressure sensor are changed, the hydraulic pressure level accumulated in the accumulator for interrupting the operation of the pump is undesirably changed. Thus, the hydraulic pressure level accumulated in the accumulator becomes insufficient to obtain satisfactorily large braking force or the hydraulic pressure level accumulated in the accumulator is raised excessively to undesirably enlarge loads which must be borne by the pump, the motor and the accumulator. Thus, there is apprehension that the durability of the above-mentioned elements deteriorate.

Since the alarm delay circuit is provided to prevent a malfunction in issuing an alarm, there arises another problem in that the cost cannot be reduced.

SUMMARY OF THE INVENTION

In view of the foregoing, an object of the present invention is to provide an abnormal condition detecting apparatus for a hydraulic brake boosting system which is capable of issuing an alarm before the level of hydraulic pressure accumulated in an accumulator becomes insufficiently low and improving the accuracy of the determination of an abnormal condition so as to prevent incorrect determination and reduce the cost and simplify the structure.

Another object of the present invention is to provide an abnormal condition detecting apparatus for a hydraulic brake boosting system which is capable of preventing insufficiently low hydraulic pressure and excessively high hydraulic pressure in an accumulator which is realized because of deterioration in a sensor.

Still another object of the present invention is to provide a safety apparatus for a hydraulic brake boosting system which is capable of restraining the driving speed of a vehicle if an abnormal condition is encountered.

To achieve the above-mentioned problems, a first aspect of the present invention is characterized in that when the gradient of the pressure rise of the pressure discharged from the pump or the hydraulic pressure accumulated in the accumulator has been made to be not larger than a set value, a determination is made that an abnormal condition has been encountered.

A second aspect of the invention is characterized in that when the gradient of the pressure depression of the hydraulic pressure accumulated in the accumulator has been made to be not smaller than the set value after the operation of the pump has been interrupted, a determination is made that an abnormal condition has been encountered.

A third aspect of the invention is characterized in that when the gradient of the pressure rise of the pressure discharged from the pump or the hydraulic pressure in the accumulator has been made to be not larger than the first set value or when the gradient of the pressure depression of the hydraulic pressure in the accumulator after the operation of the pump has been interrupted is made to be not smaller than the second set value, a determination is made that an abnormal condition has been encountered.

A fourth aspect of the invention is characterized in that when the gradient of the pressure rise in the pressure discharged from the pump of the hydraulic pressure accumulated in the accumulator has been made to be not smaller than the set value, a determination is made that an abnormal condition has been 9. encountered.

A fifth aspect of the invention is characterized in that when the pulsating frequency of the pump does not satisfy the set range, a determination is made that an abnormal condition has been encountered.

A sixth aspect of the invention is characterized in that the pulsating frequency of the pump is a pulsating frequency of a detection signal transmitted from a pressure sensor for detecting the pressure discharged from the pump or a pulsating frequency of an electric current of a motor for operating the pump.

A seventh aspect of the invention is characterized in that when the number of revolutions of the motor does not satisfy the set range, a determination is made that an abnormal condition has been encountered.

An eighth aspect of the invention is characterized in that when the absolute value of the difference between at least two frequencies among a pulsating frequency of a detection signal supplied from a pressure sensor for detecting pressure discharged from a pump, a pulsating frequency of an electric current in a motor for operating the pump and the number of revolutions of the motor is larger than the predetermined set value, determination is made that an abnormal condition has been encountered.

A ninth aspect of the invention is characterized in that when determination that an abnormal condition has been encountered has been made sequentially predetermined number of times, determination is made that an abnormal condition has been encountered.

A tenth aspect of the invention is characterized in that determination of an abnormal condition is inhibited during a braking operation.

An eleventh aspect of the invention is characterized in that the braking operation is detected in response to an ON signal of a brake switch, a rapid change signal of the hydraulic pressure in the accumulator supplied from pressure detecting means or a traction-control operation signal generated when the braking operation is performed.

A twelfth aspect of the invention is characterized in that when the voltage of the motor for operating the pump is not higher than a predetermined voltage level, determination of an abnormal condition is inhibited.

A thirteenth aspect of the invention is characterized in that determination of an abnormal condition is made by operating the pump at predetermined time intervals when an ignition switch is being switched on.

A fourteenth aspect of the invention is characterized in that when the pressure discharged from the pump is not lower than a predetermined set level, determination of an abnormal condition is inhibited.

A fifteenth aspect of the invention is characterized in that extraction of the pressure discharged from the pump (the hydraulic pressure in the accumulator) or an electric current of the motor is performed at a multiple of the pulsating frequency of the pump.

A sixteenth aspect of the invention is characterized in that the set value or the set range is changed in accordance with the voltage of the motor for operating the pump.

A seventeenth aspect of the invention is characterized in that a maximum speed of a vehicle is limited or driving of the vehicle is inhibited in response to an output signal from the driving-speed-control-signal generating means when an abnormal condition has been detected.

The first to sixteenth aspects of the invention have the structure that an abnormal condition is determined in accordance with a state of the pressure discharged from the pump or that of the hydraulic pressure in the accumulator.

The first aspect of the invention has the structure that the abnormal condition is detected when the gradient of the pressure rise in the pressure discharged from the pump or the hydraulic pressure accumulated in the accumulator. Therefore, an abnormal condition of the pump and the motor can be detected. The second aspect of the invention has the structure that an abnormal condition is detected when the gradient of the pressure depression of the hydraulic pressure in the accumulator is not smaller than the set value. Therefore, an abnormal leakage of solution in a hydraulic pressure-circuit in the accumulator portion can be detected. The third aspect of the invention is able to detect an abnormal condition of the pump and the motor and abnormal leakage of the solution.

The fourth aspect of the invention has the structure that an abnormal condition is detected when the gradient of the pressure rise in the pressure discharged from the pump or the hydraulic pressure accumulated in the accumulator is not smaller than the set value. Therefore, an abnormal condition that the pressure of a gas enclosed in the accumulator is excessively lowered can be detected. The fifth to seventh aspects of the invention have the structure that the abnormal condition is detected when the pulsating frequency of a signal supplied from the pressure sensor, the pulsating frequency of an electric current of a motor or the number of revolutions of the motor is larger than a set range. Therefore, an abnormal condition such as racing of the motor or the pump can be detected. Since an abnormal condition is detected when the pulsating frequency of the signal, the pulsating frequency of an electric current or the number of revolutions of the motor is smaller than the set range, an abnormal condition such as locking of the motor and the pump can be detected. Since the abnormal condition is detected when the absolute value of the difference in the frequency among the pulsating frequency of the signal supplied from the pressure sensor, the pulsating frequency of an electric current of the motor and the number of revolutions of the motor is not smaller than the set value, an abnormal condition of the pressure sensor and the motor can be detected.

The ninth aspect of the invention has the structure that an abnormal condition is detected when determination of an abnormal condition has made sequentially predetermined number of times. Therefore, an influence of a detection error can be prevented. Thus, the accuracy in determining the abnormal condition can be improved and an incorrect determination of an abnormal condition can be prevented.

The tenth to eleventh aspects of the invention have the structure that the determination of an abnormal condition is not performed when the braking operation is being performed, for example, when the brake switch is being switched on, when the hydraulic pressure in the accumulator has been rapidly changed or when the traction control operation is being performed. Therefore, incorrect determination of an abnormal condition can be prevented when the accumulated pressure in the accumulator 7 has greatly been changed. The twelfth aspect of the invention has the structure that the determination of an abnormal condition is not performed when the voltage of the motor is not higher than a set voltage level. Therefore, incorrect determination of an abnormal condition can be prevented if the number of revolutions of the motor is changed because of low voltage of the motor.

The thirteenth aspect of the invention has the structure that an abnormal condition is determined by operating the pump at predetermined time intervals in a state in which the ignition switch is being switched on. Therefore, even if the hydraulic pressure accumulated in the accumulator is not lower than the predetermined level, detection of an abnormal condition can be performed. Moreover, an abnormal condition of the pump, the motor or the pressure sensor can early be detected. The fourteenth aspect of the invention has the structure that the determination of an abnormal condition at the predetermined time intervals in a state in which the ignition switch is being switched on is not performed when the hydraulic pressure accumulated in the accumulator is not lower than the predetermined level. Therefore, unnecessary determination of an abnormal condition can be prevented.

The fifteenth aspect of the invention has the structure the extraction of the pressure discharged from the pump, the hydraulic pressure in the accumulator or an electric current of the motor is performed at a multiple of the pulsating frequency of the pump. Therefore, no influence of the pulsation of the pump is not exerted on the extraction. Thus, the determination of an abnormal condition can accurately be performed. The sixteenth aspect of the invention has the structure that the set value or the set range serving as a reference for a comparison is changed in accordance with the voltage of the motor. Therefore, the detection of an abnormal condition can furthermore precisely and accurately be performed.

The seventeenth aspect of the invention has the structure that the maximum speed of the vehicle is limited or driving of the vehicle is inhibited when an abnormal condition has been detected. Therefore, safety driving of the vehicle can be performed. Moreover, driving cannot be performed when the vehicle is stopped. As a result, even if the hydraulic brake boosting system encounters an abnormal condition, safety can be maintained.

BRIEF DESCRIPTION OF THE DRAWINGS

FIGS. 3A and 3B are diagrams showing a map for use to perform determination of an abnormal condition according to the present invention and composed of set values a and I;

DETAILED DESCRIPTION OF THE PREFERRED EMBODIMENTS

Figure 1:
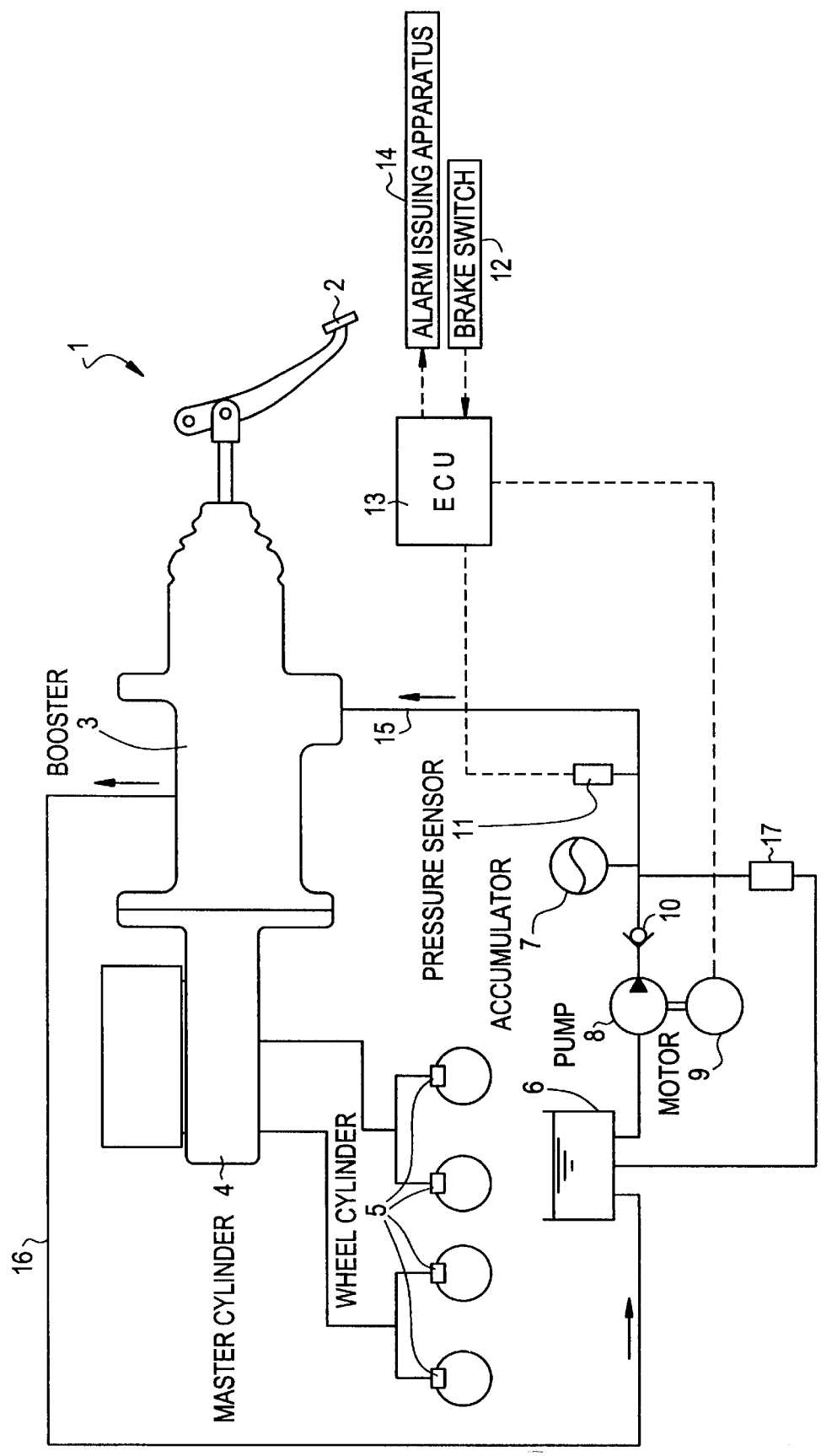
FIG. 1 is a diagram showing a hydraulic brake boosting system to which a first embodiment of an abnormal condition detecting apparatus according to the present invention is applied.

Referring to the drawings, embodiments of the present invention will now be described.

FIG. 1 is a diagram showing a hydraulic brake boosting system to which a first embodiment of an abnormal condition detecting apparatus according to the present invention is applied.

As shown in FIG. 1, the hydraulic brake boosting system 1 incorporates a brake pedal 2; a closed-center-type hydraulic brake booster (hereinafter simply called a "booster") 3 arranged to be operated by the brake pedal 2 and capable of boosting depressing force applied to the brake pedal 2 so as to produce an output; a tandem type master cylinder 4 arranged to be operated in response to the output from the booster 3 and capable of generating pressure of brake solution; a wheel cylinder 5 arranged to be operated with the pressure of the brake solution supplied from the master cylinder 4 and capable of generating braking force which must be applied to each wheel; a reservoir 6 for reserving operating fluid; an accumulator 7 for accumulating hydraulic pressure; a pump 8 arranged to suck the operating fluid supplied from the reservoir 6 to discharge the operating fluid to the accumulator 7 so as to accumulate the hydraulic pressure in the accumulator 7; a motor 9 for operating the pump 8; a check valve 10 for preventing leakage of the accumulated hydraulic pressure in the accumulator 7 to the pump 8; a pump-operating pressure sensor 11 for detecting the hydraulic pressure accumulated in the accumulator 7 for controlling the operation of the pump 8; a brake switch 12 for detecting depression of the brake pedal 2; an electronic control unit (ECU) 13 to which a brake operation detection signal is supplied and capable of controlling the operation of the motor 9 in response to the supplied signal and an alarm-issuing apparatus 14 for issuing an alarm when an abnormal condition of the pump 8, the motor 9 or the pump-operating pressure sensor 11 has been detected. Since the above-mentioned elements of the hydraulic brake boosting system 1 are known elements, they are omitted from detailed description.

The hydraulic brake boosting system 1 having the above-mentioned structure has an arrangement similar to the conventional hydraulic brake boosting system and formed such that when the hydraulic pressure accumulated in the accumulator 7 has been reduced to ON-pressure for the pump-operating pressure sensor 11, the pump-operating pressure sensor 11 is turned on. Thus, the ECU 13 operates and controls the motor 9. When the motor 9 has been operated, the pump 10 is operated so that operating fluid in the reservoir 6 is supplied to the accumulator 7 so that hydraulic pressure is accumulated in the accumulator 7. When the hydraulic pressure accumulated in the accumulator 7 has been made to the OFF-pressure for the pump-operating pressure sensor 11, the pump-operating pressure sensor 11 is turned off. Thus, the ECU 13 interrupts the operation of the motor 9, that is, the pump 8. As a result, hydraulic pressure having a predetermined level is accumulated in the accumulator 7.

When the brake pedal 2 has been depressed in the above-mentioned state, the hydraulic pressure in the accumulator 7 is, through the passage 15, introduced into an operating chamber in the booster 3. The booster 3 boosts the depressing force applied to the brake pedal 2 and produces an output. In accordance with the output, the master cylinder 4 is operated so that braking pressure is generated. The braking pressure generated by the master cylinder 4 is supplied to each wheel cylinder 5. Thus, each wheel cylinder 5 brakes each wheels.

When the brake pedal 2 has been released, the operating fluid introduced into the operating chamber in the booster 3 is discharged to the reservoir 6 through a passage 16. Therefore, the booster 3, the master cylinder 4 and each wheel cylinder 5 are deactivated, causing braking of each wheel to be suspended.

If the accumulator 7, the pump 8, the motor 9 or the pump-operating pressure sensor 11 or the like encounters an abnormal condition, the ECU 13 transmits an alarm signal to the alarm-issuing apparatus 14. The alarm-issuing apparatus 14 issues an alarm so that occurrence of an abnormal condition is communicated to a driver (the foregoing alarm is an essential portion of the present invention as described later).

Reference numeral 17 represents a relief valve for relieving hydraulic pressure accumulated in the accumulator 7 to the reservoir 6 when the hydraulic pressure accumulated in the accumulator 7 is made to be not lower than a relieving pressure so as to reduce loads which must be borne by the accumulator 7, the pump 8 and the motor 9.

Figure 2:
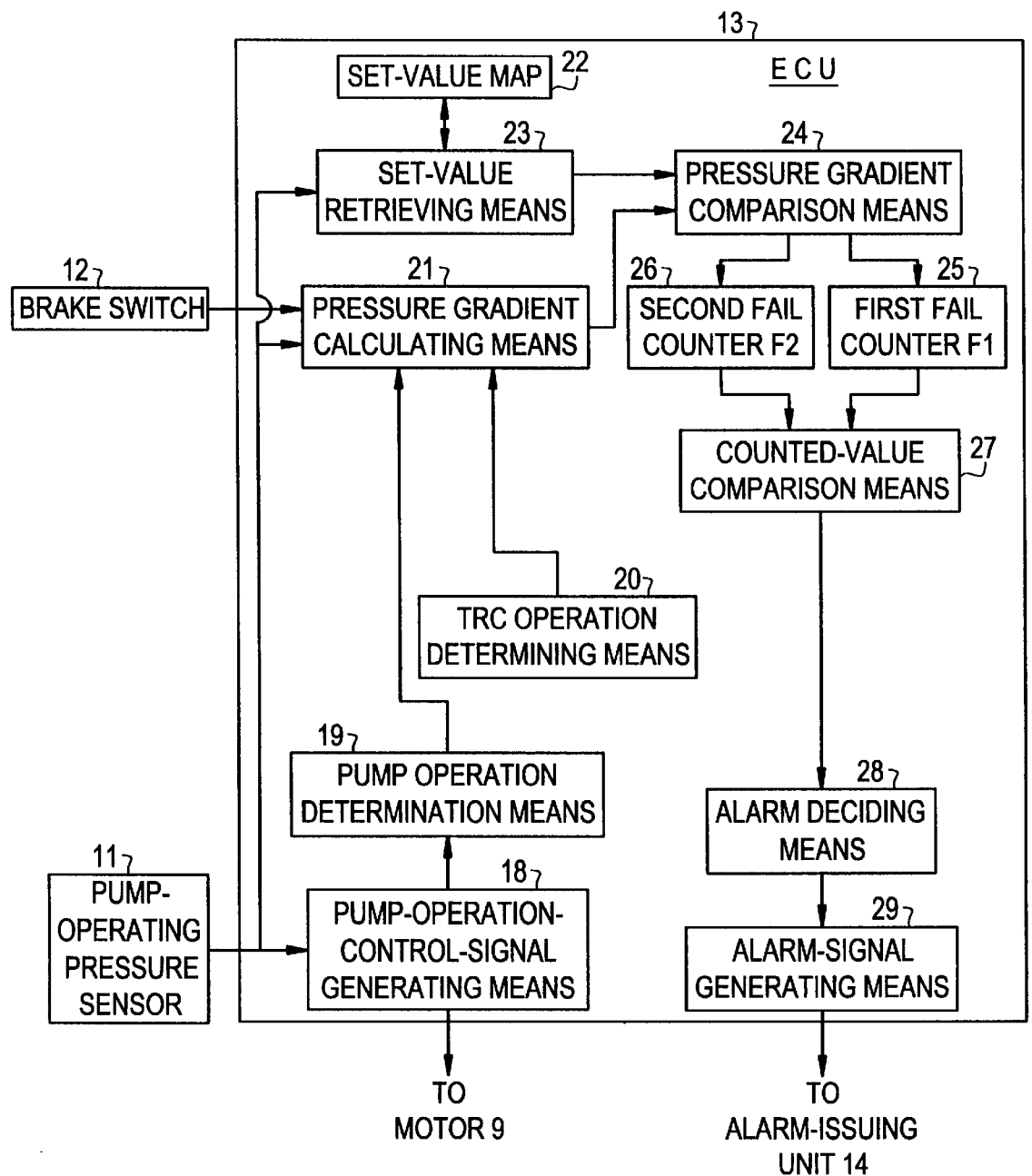
FIG. 2 is schematic view showing an electronic control unit adapted to the abnormal condition detecting apparatus according to the first embodiment and arranged to control the operation of an alarm-issuing apparatus.

FIG. 2 is a schematic view showing the ECU 13 for use in the abnormal condition detecting apparatus according to the first embodiment and arranged to control the operation of the alarm-issuing apparatus 14.

As shown in FIG. 2, the ECU 13 according to the first embodiment incorporates a pump-control-signal generating means 18 for transmitting, to the motor 9, a pump-operation-control signal in response to an ON signal supplied from the pump-operating pressure sensor 11; a pump operation determination means 19 for determining whether or not the pump 8 is being operated in response to an output signal from the pump-operation-control-signal generating means 18; a TRC operation determining means 20 for determining whether or not a traction control system (hereinafter also called a "TRC") for braking a drive wheel when there is a tendency that racing of the drive wheel takes place so as to eliminate the tendency of racing of the drive wheel is being operated; a pressure gradient calculating means 21 for calculating a pressure gradient when both of the brake and the TRC are not being operated and the pump 8 is being operated in response to output signals from the pump-operating pressure sensor 11, the brake switch 12, the pump operation determination means 19 and the TRC operation determining means 20; a map 22 having set values a and P set so as to be subjected to a comparison with the pressure gradient; a set-value retrieving means 23 for retrieving the map 22 to obtain set values a and 0 corresponding to the hydraulic pressure accumulated in the accumulator 7 in response to an output signal from the pump-operating pressure sensor 11; a pressure gradient comparison means 24 for subjecting the pressure gradient calculated by the brake pedal 2 and the set values a and 0 retrieved by the set-value retrieving means 23 to a comparison so as to produce an output; a first fail counter (F1) 25 for performing counting in response to a signal transmitted from the pressure gradient comparison means 24; a second fail counter (F2) 26 for performing counting in response to a signal transmitted from the pressure gradient comparison means 24 when the pressure gradient is smaller than the set value α; a counted-value comparison means 27 for subjecting counted values F1 and F2 of the first and second fail counters 25 and 26 and predetermined counted values Fβ and Fα to comparisons so as to produce an output when the counted values F1 and F2 are larger than the set counted values Fβ and Fα; an abnormal-condition determining means 28 for deciding abnormal condition and produces an output when the operation signal from the counted-value comparison means 27 has sequentially supplied predetermined number of times (for example, three times); and an alarm-signal generating means 29 for issuing an alarm signal to the alarm-issuing apparatus 14 in response to the output signal from the abnormal-condition determining means 28.

The abnormal condition determination according to the first embodiment will now be described. When the accumulated pressure in the accumulator 7 has been lowered and thus the pump 8 has been operated by the pump-operating pressure sensor 11, the pressure gradient calculating means 21 calculates the pressure gradient (change in predetermined time occurring in predetermined time, which is gradient of rise in the pressure in this case) of the pressure discharged from the pump in accordance with the accumulated pressure in the accumulator 7 (the discharged pressure from the pump). If the gradient of the rise in the pressure is smaller than the set value a, the pressure in the accumulator 7 cannot normally be raised even if the pump 8 is operated. Thus, an abnormal condition (in many cases an abnormal condition of the pump 8) is determined. If a case in which the gradient of the rise in the pressure is smaller than the set value α sequentially occurs predetermined times (Fα), the abnormal condition is decided. Thus, incorrect determination can be prevented.

After the pump has been operated and then interrupted, the pressure gradient calculating means 21 calculates the pressure gradient (which is the gradient of pressure depression) of the pressure discharged from the pump in accordance with the pressure discharged from the pump communicated from the pump-operating pressure sensor 11. If the gradient of pressure depression is larger than the set value β, the pressure in the accumulator 7 cannot normally be lowered. Thus, a determination is made that an abnormal condition has been encountered (in many cases, an abnormal condition such as leakage of solution in the accumulator 7). Similarly, if a case in which the gradient of pressure depression is larger than the set value β is sequentially occurs predetermined number of times (Fβ), an abnormal condition is decided. Thus, incorrect determination can be prevented.

The set values α and β which are subjected to comparisons with the calculated pressure gradient are set made to be smaller in proportion to the pump discharge pressure P in accordance with the pump discharge pressure P. In this case, the map 22 is produced in which the set values α and β corresponding to the pump discharge pressure P are listed. An example of the map 22 may have a structure as shown in FIG. 3A in which the pressure regions are sectioned into a predetermined number of pressure ranges and, in each pressure range, the set value α is set to be values A, B, C,. . ., and set value β is set to be values α, b, c, . . . Another structure as shown in FIG. 3B may be employed in which the pressure region is sectioned into two pressure regions. Moreover, in each pressure range, the set value α is set to be values A and B and the set value β is set to be values a and b. As a matter of course, another map including the set values α and β may be employed. The set-value retrieving means 23 retrieves the set values a and β from the set-value map 22 in accordance with the pump discharge pressure so as to extract the same.

To prevent incorrect determination of an abnormal condition because the accumulated pressure in the accumulator 7 is greatly changed when a braking operation is performed, determination of an abnormal condition is inhibited. As a method for detecting a braking operation, a method for detecting an ON signal of the brake switch 12 is detected, a method of detecting an ON signal of the TRC operation determining means 20 is detected during the operation of the TRC or a method of detecting a rapid change signal representing the accumulated pressure in the accumulator 7 and supplied from the pump-operating pressure sensor 11 may be employed.

Figure 4:
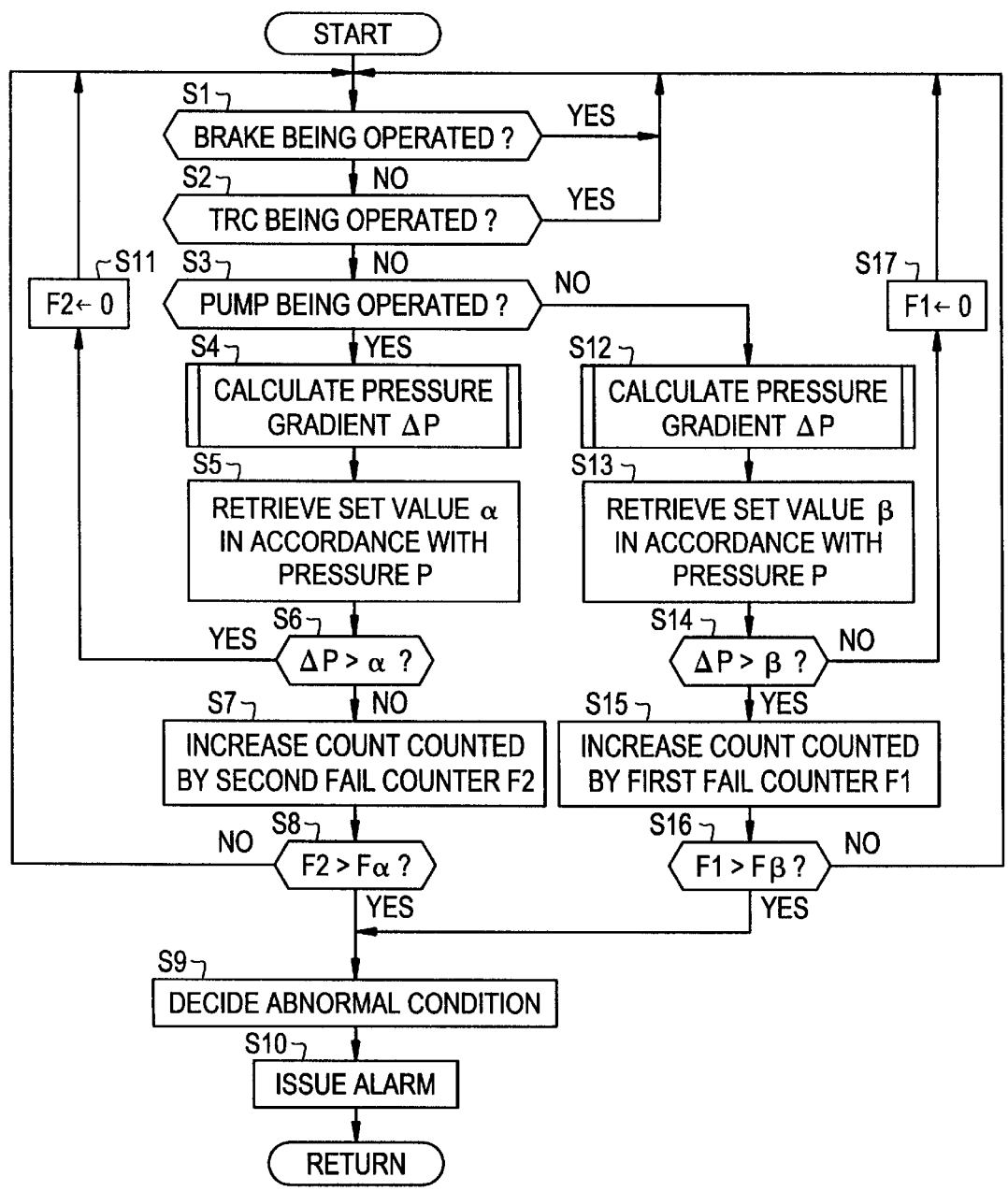
FIG. 4 shows a portion of a flow chart for performing Gus detection of an abnormal condition according to the first embodiment.

FIG. 4 is a flow chart of the determination of an abnormal condition according to the first embodiment.

Figure 5:
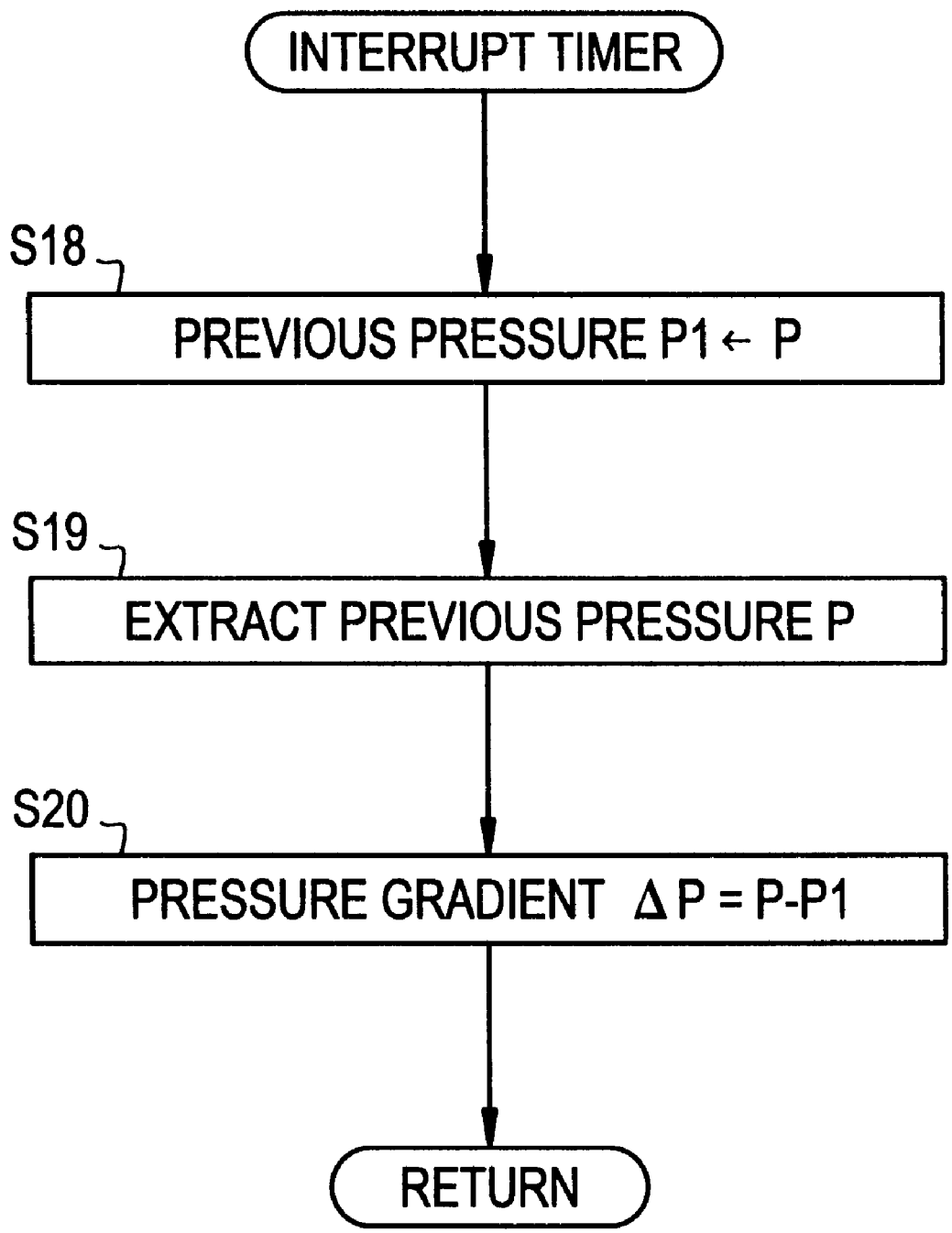
FIG. 5 shows a portion of the flow chart for performing the detection of an abnormal condition according to the first embodiment.

As shown in FIG. 4, in step S1 whether or not the brake is being operated is determined. If a determination is made that the brake is not being operated, whether or not the TRC is being operated is determined in step S2. If a determination is made that the TRC is not being operated, whether or not the pump 8 is being operated is determined in step S3. If a determination is made that the pump 8 is being operated, the pressure gradient ΔP is calculated in step S4. As shown in FIG. 5, the calculation of the pressure gradient ΔP is performed in such a manner that the pump discharge pressure (accumulated pressure in the accumulator 7) P extracted previously is set to be previous pressure P1 in step S18. In step S19 the present pump discharge pressure P is extracted. In step S20 the pressure gradient ΔP (=P−P1) is obtained by subtracting the previous pressure P1 from the present pressure P (at this time the pressure gradient AP is the gradient of the rise in the pressure because the pump 8 is being operated). In actual, the pressure gradient ΔP is expressed by the difference in the pressure in unit time obtained by dividing the P−P1 by time from the previous pressure to the present pressure.

In step S5 the set value α corresponding the pump discharge pressure is retrieved in the set-value map 22 and extracted. In step S6 whether or not the pressure gradient ΔP is larger than the set value α is determined. If a determination is made that the pressure gradient ΔP is not larger than the set value α, counting is performed by the second fail counter 26 in step S7. That is, if the pressure is not raised as compared with a normal case even if the pump 8 is being operated, an abnormal condition is determined so that the second fail counter 26 starts counting. In step S8 whether or not the counted value F2 is larger than the set counted value Fα is determined. If a determination is made that the counted value F2 is larger than the et counted value Fα, the abnormal condition is decided in step S9. That is, when abnormal rise in the pressure sequentially takes place by set counted value Fα, the abnormal condition is decided. As a result of the foregoing decision, an alarm signal is issued in step S10. Thus, the alarm-issuing apparatus 14 issues an alarm. Thus, the abnormal condition of the pump 8 or the like is detected.

If a determination is made in step S8 that the counted value F2 is not larger than the set counted value Fα, abnormal rise in the pressure during the operation of the pump does not take place sequentially by the set counted value Fα. Therefore, the operation returned to step S1. Thus, processes in step S1 and following steps are repeated. If a determination is made in step S6 that the pressure gradient ΔP is larger than the set value a, a determination is made that the rise in the pressure is in a normal state. Thus, the counted value F2 counted by the second fail counter 26 is cleared. Then, the operation is returned to step S1. If a determination is made in step S that the braking fib operation is being performed or if the TRC is not being operated in step S2, the operation is returned to step S1 similarly.

If a determination is made in step S3 that the pump 8 is not being operated, the pressure gradient ΔP is calculated in step S12. Similarly to the above-mentioned process, the calculation of the pressure gradient ΔP is performed in accordance with the flow shown in FIG. 5. The pressure gradient ΔP at this time is gradient of pressure depression because the operation of the pump 8 has been interrupted. In step S13 the set-value map 22 which has been produced is used to retrieve and extract the set value β corresponding to the accumulated pressure in the accumulator 7. In step S14 whether or not the pressure gradient ΔP is larger than the set value P is determined. If a determination is made that the pressure gradient ΔP is larger than the set value β, the first fail counter 25 performs counting in step S15. That is, if the pressure is greatly reduced as compared with a normal state even after the operation of the pump 8 has been interrupted, an abnormal condition is determined. Thus, the first fail counter 25 starts counting. In step S16 whether or not the counted value F1 is larger than the set counted value Fβ is determined. If a determination is made that the counted value F1 is larger than the set counted value F1, the operation is shifted to step S9 so that the abnormal condition is decided. That is, when abnormal depression of the pressure continuous takes place by the set counted value Fβ, the abnormal condition is decided. The following processes are similar to the above-mentioned processes. Thus, an abnormal condition such as leakage of the solution in the accumulator 7 can be detected.

If a determination is made in step S14 that the pressure gradient ΔP is not larger than the set value α, a determination is made that the pressure depression is in a normal state. Thus, the counted value F1 counted by the first fail counter 25 is cleared in step S17, and then the operation is returned to step S1.

In a case of a hydraulic brake boosting system having no TRC, the above-mentioned condition that the determination of an abnormal condition is not performed during the TRC is being operated is deleted. As a matter of course, the TRC operation determining means 20 and the process in step S2 in the above-mentioned flow chart are not provided.

The abnormal condition detecting apparatus according to the first embodiment has the structure that the determination of an abnormal condition of the pump 8 and leakage of solution in accordance with the gradient of the rise in the pressure calculated when the operation of the pump 8 has been started or calculated after the operation of the pump 8 has been interrupted. Therefore, determination of an abnormal condition can accurately be performed before the braking force becomes insufficiently small because of reduction in the accumulated pressure in the accumulator 7. Moreover, issue of the alarm can reliably be performed thanks to the determination of an abnormal condition.

Since the set values a and i which are subjected to the comparison with the calculated pressure gradient are set in accordance with the accumulated pressure in the accumulator 7, the detection of an abnormal condition can be performed in a wide hydraulic pressure range accumulated in the accumulator 7 from a low pressure level to a high pressure level. Moreover, the accuracy in determining an abnormal condition can be improved. Even if the vehicle is started in a state in which the accumulated pressure in the accumulator 7 is reduced after the vehicle has been allowed to stand for long time, a malfunction of the alarm issuing operation can be prevented because the determination of an abnormal condition is performed in accordance with the accumulated pressure in the accumulator 7. Moreover, the costly alarm delay circuit as has been required for the conventional apparatus is not required. Thus, the cost can be reduced.

Since the abnormal condition is decided only when abnormal condition has been sequentially detected several times, incorrect determination of an abnormal condition can be prevented. Therefore, the accuracy in determining an abnormal condition can furthermore be improved.

Figure 6:
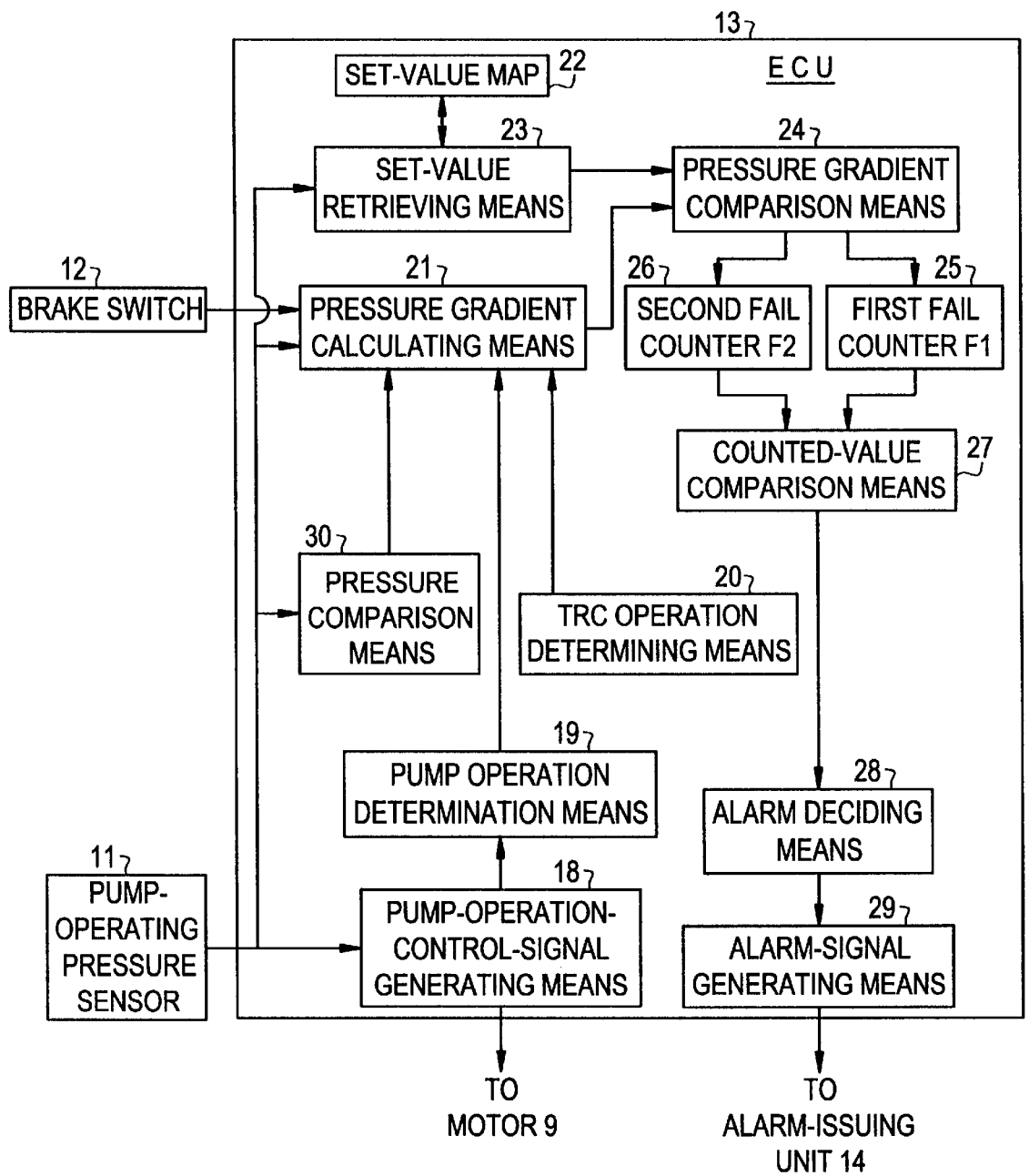
FIG. 6 is a diagram showing a second embodiment of the present invention.

FIG. 6 is a diagram showing a second embodiment of the present invention similarly to FIG. 2.

As shown in FIG. 6, the abnormal condition detecting apparatus according to the second embodiment is provided with a pressure comparison means 30 in addition to the structure according to the first embodiment. The pressure comparison means 30 inhibits the determination of an abnormal condition according to the first embodiment if the pump discharge pressure P is higher than predetermined level P0. That is, if the pump discharge pressure P is high, a determination can be made that the operations of the pump 8 and the motor 9 are in a normal state. Therefore, unnecessary determination of an abnormal condition is prevented.

Figure 7:
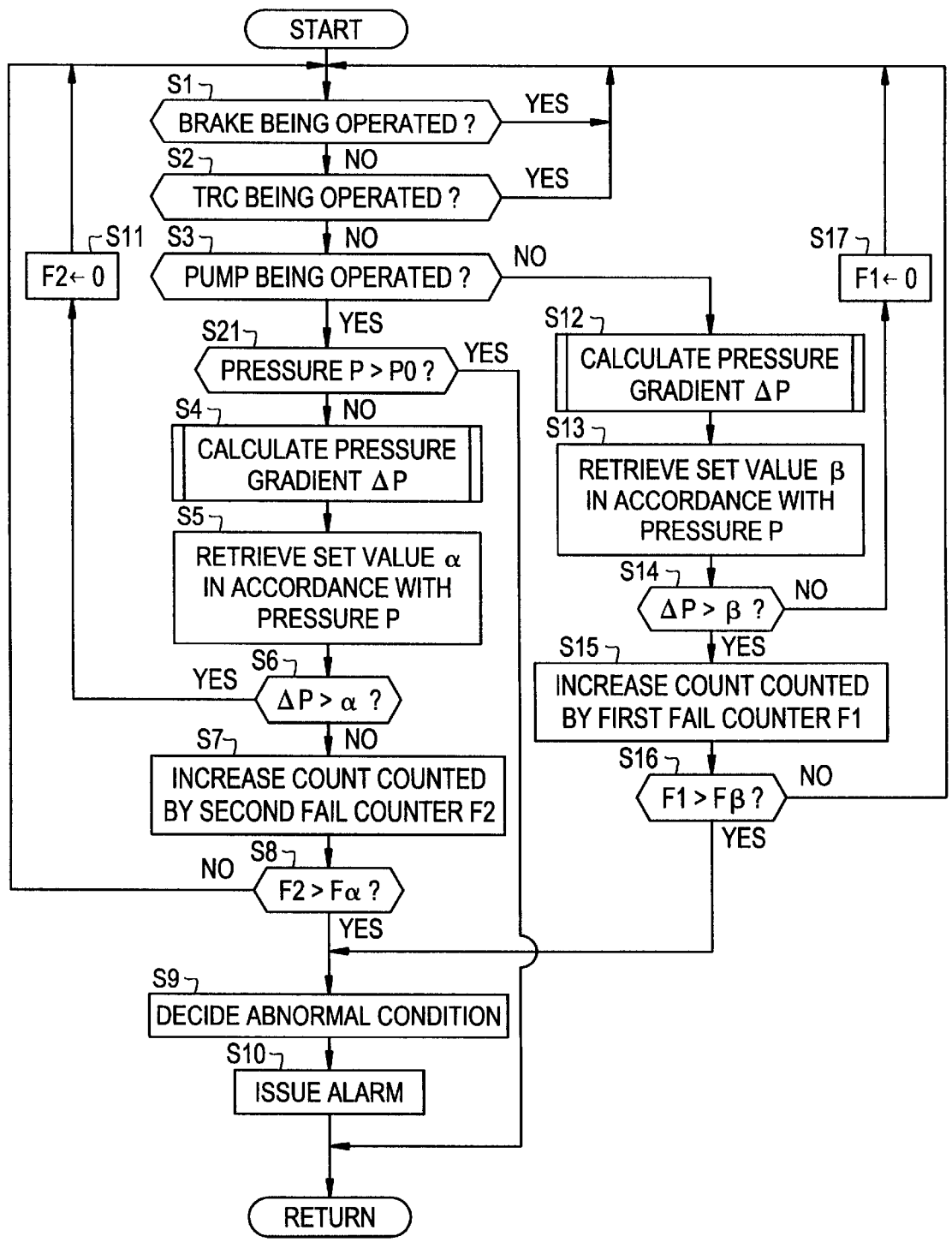
FIG. 7 is a flow chart for performing detection of an abnormal condition according to a second embodiment.

The determination of an abnormal condition according to the second embodiment is performed in accordance with a flow shown in FIG. 7. In the flow according to the second embodiment, step S21 for making a determination whether or not the pump discharge pressure P is higher than the predetermined level P0 is provided for the flow according to the first embodiment at a position between the step S3 for detecting whether or not the booster 3 is being operated and step S4 for calculating the pressure gradient ΔP. That is, if a determination is made in step S21 that the pump discharge pressure P is not higher than the predetermined level P0, the determination of an abnormal condition in step S4 and following steps is performed, the determination being the same as that according to the first embodiment. If a determination is made that the pump discharge pressure P is higher than the predetermined level P0, the determination of an abnormal condition is not performed. In this case, the operation is returned to step S1.

The other structures and the other processes in the flow chart according to the second embodiment are the same as those according to the first embodiment.

The abnormal condition detecting apparatus according to the second embodiment is able to eliminate determination of an abnormal condition if the pump discharge pressure P is high and a determination can be made that the operations of the pump 8 and the motor 9 are in a normal state. Therefore, unnecessary determination of an abnormal condition can be prevented.

Figure 8:
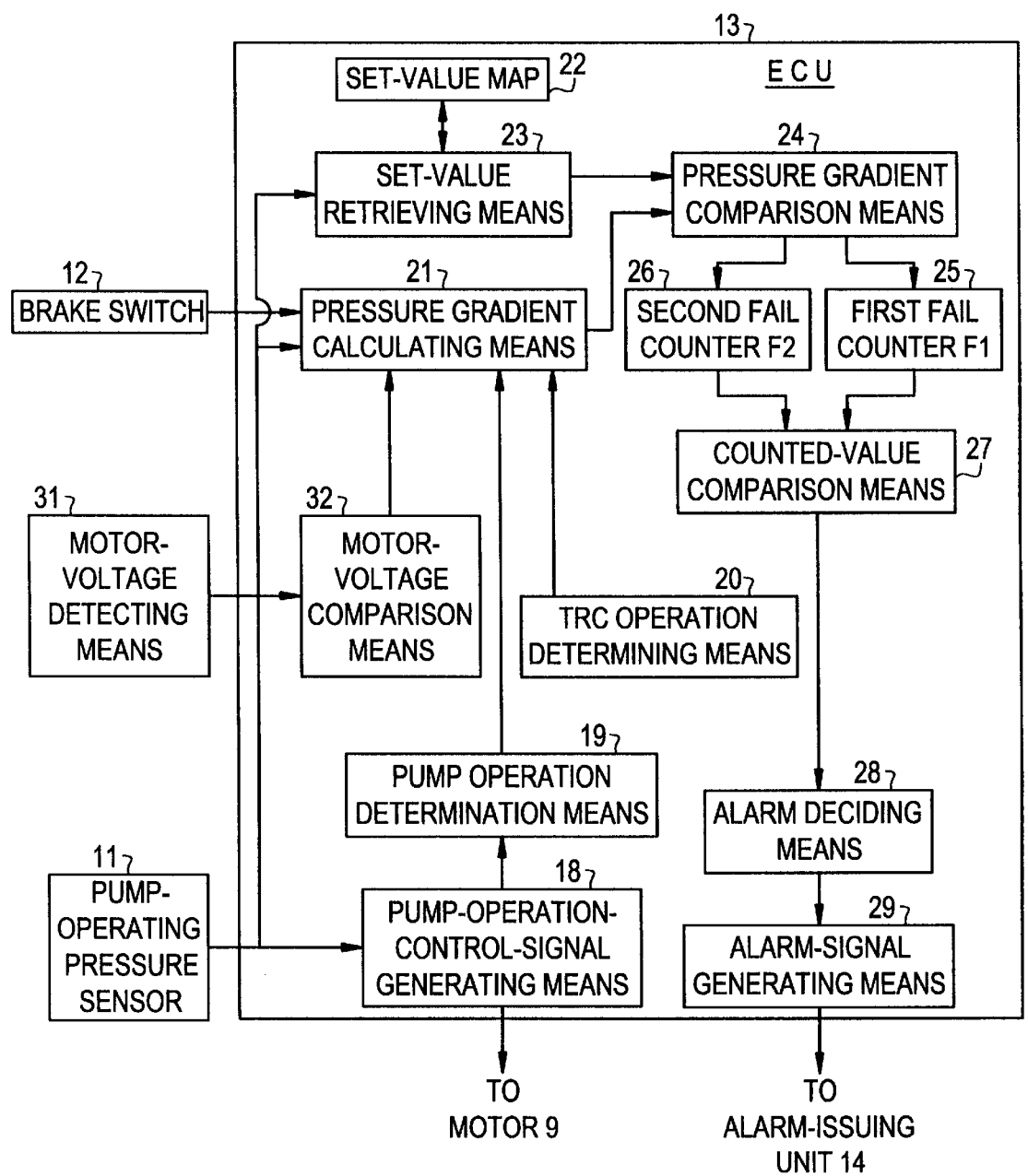
FIG. 8 is a diagram showing a third embodiment of the present invention.

FIG. 8 is a diagram showing a third embodiment of the present invention similarly to FIG. 2.

The above-mentioned second embodiment incorporates the pressure comparison means 30 which inhibits the determination of an abnormal condition according to the first embodiment if the pump discharge pressure P is higher than the predetermined level P0. The abnormal condition detecting apparatus according to the third embodiment, as shown in FIG. 8, incorporates a motor-voltage detecting means 31 and a motor-voltage comparison means 32. The motor-voltage comparison means 32 inhibits the determination of an abnormal condition according to the first embodiment if the voltage of the motor is lower than a predetermined level E. That is, if the voltage of the motor is low, the rotations of the pump 8 is instable and the same can easily be changed. Therefore, incorrect determination of an abnormal condition can easily be performed. Therefore, determination of an abnormal condition is inhibited if the voltage of the motor is low.

Figure 9:
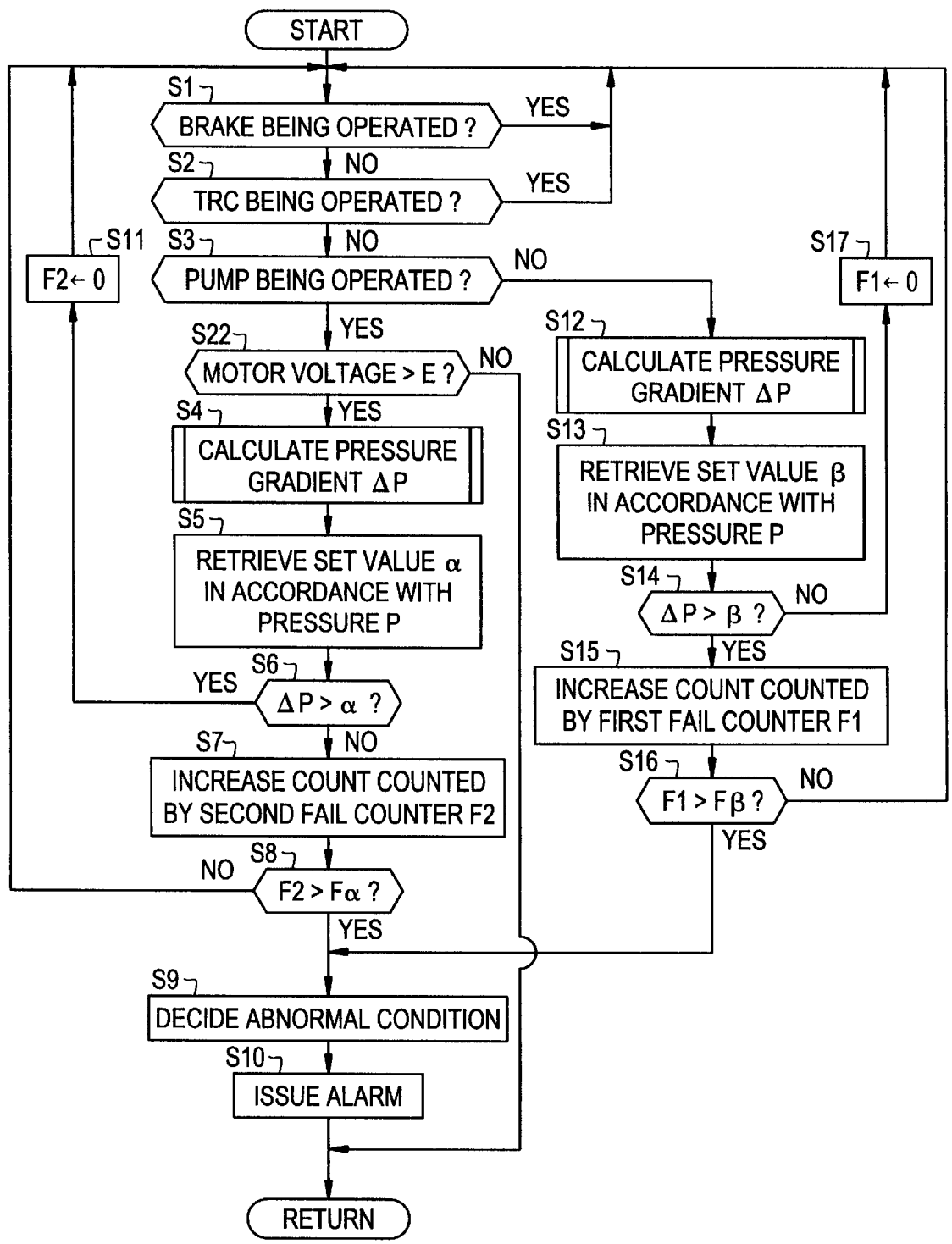
FIG. 9 is a flow chart for performing detection of an abnormal condition according to the third embodiment.

The determination of an abnormal condition according to the third embodiment is performed in accordance with a flow chart shown in FIG. 9. In the flow chart according to the third embodiment, step S22 for determining whether or not the voltage of the motor is higher than the predetermined level E is provided in place of step S21 according to the second embodiment. If a determined is made in step S22 that the voltage of the motor is higher than the predetermined level E, the determination of an abnormal condition is performed in step S4 and following steps in a manner which is the same as that according to the first embodiment. If a determination is made that the voltage of the motor is higher than the predetermined level E, the determination of an abnormal condition is not performed. Then, the operation is returned to step S1. The other structures and processes in the flow chart according to the third embodiment are the same as those according to the first embodiment.

The abnormal condition detecting apparatus according to the third embodiment has the structure that determination of an abnormal condition is inhibited when the voltage of the motor is low because the rotations of the motor 9 can easily be made to be instable and thus incorrect determination can easily be made. Therefore, an error in the determination of the abnormal condition can be prevented.

Figure 10:
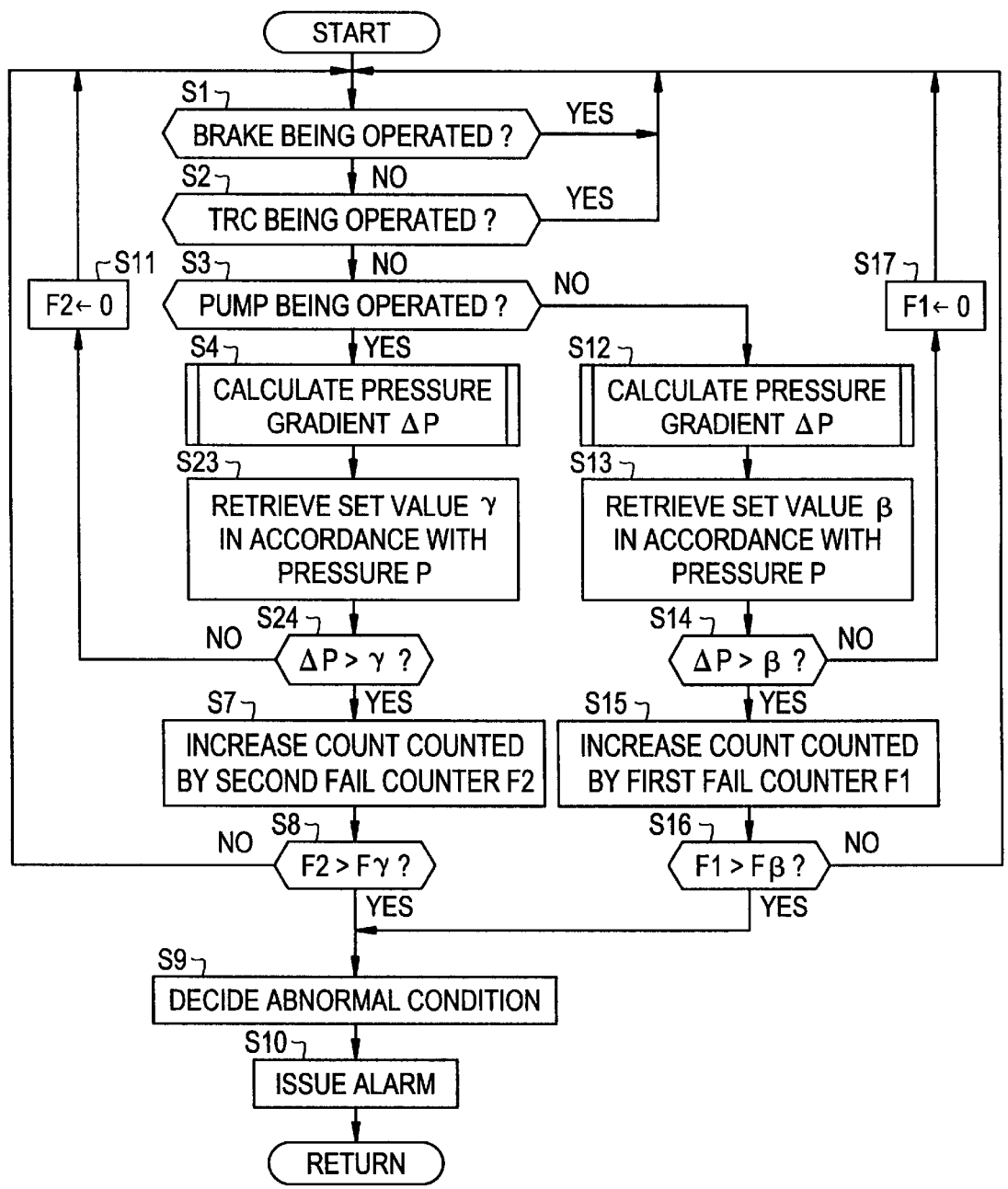
FIG. 10 is a flow chart for performing detection of an abnormal condition according to a fourth embodiment of the present invention.

FIG. 10 is a flow chart according to a fourth embodiment of the present invention similarly to FIG. 4.

The above-mentioned first embodiment has the structure that when the pressure rise gradient $\Delta P$ is smaller than the set value $\alpha$, the discharged pressure from-the pump 8 is low and thus a determination is made that the pump 8 or the motor 9 has encountered an abnormal condition. The fourth embodiment has a structure that when the pressure rise gradient $\Delta P$ is larger than a predetermined set value $\gamma$, a determination is made that the discharge pressure from the pump 8 is excessively high and thus the pump 8 or the motor 9 has encountered an abnormal condition. If the pressure of a gas enclosed in the accumulator 7 is excessively reduced and the elasticity of the accumulator 7 becomes extinct, introduction of the operating fluid from the pump 8 into the accumulator 7 causes the accumulated pressure in the accumulator 7 to rapidly be raised at an excessively steep gradient of the rise in the pressure. Therefore, when excessive rise in the pressure takes place at a certain pressure level at a degree inconceivable at the level, a determination is made that the accumulator 7 has encountered an abnormal condition because of reduction in the gas pressure.

The structure of the ECU 13 according to the fourth embodiment is substantially the same as that according to the embodiment shown in FIG. 2. The difference is that the set-value map 22 is a map composed of the set value $\gamma$, the set-value retrieving means 23 retrieves the set value $\gamma$ and the pressure gradient comparison means 24 subjects the pressure gradient with the set value $\gamma$. A flow according to the fourth embodiment has a structure that step S5 in the flow according to the first embodiment shown in FIG. 4 is replaced by a step S23 for retrieving set value $\gamma$ in accordance with the pump discharge pressure P. Step S6 is replaced by step S24 for determining whether or not the pressure gradient $\Delta P$ is larger than the set value $\gamma$. The other structures are the same as those according to the first embodiment. If a determination is made in step S24 that the pressure gradient $\Delta P$ is larger than set value $\gamma$, a determination is made that an abnormal condition is encountered. In step S8 the second fail counter 26 starts counting. If the pressure gradient $\Delta P$ is not larger than the set value $\gamma$, the second fail counter 26 clears the count in step S11. Then, the operation is returned to step S1.

The other structures and processes in the flow are the same as those according to the first embodiment.

Figure 11:
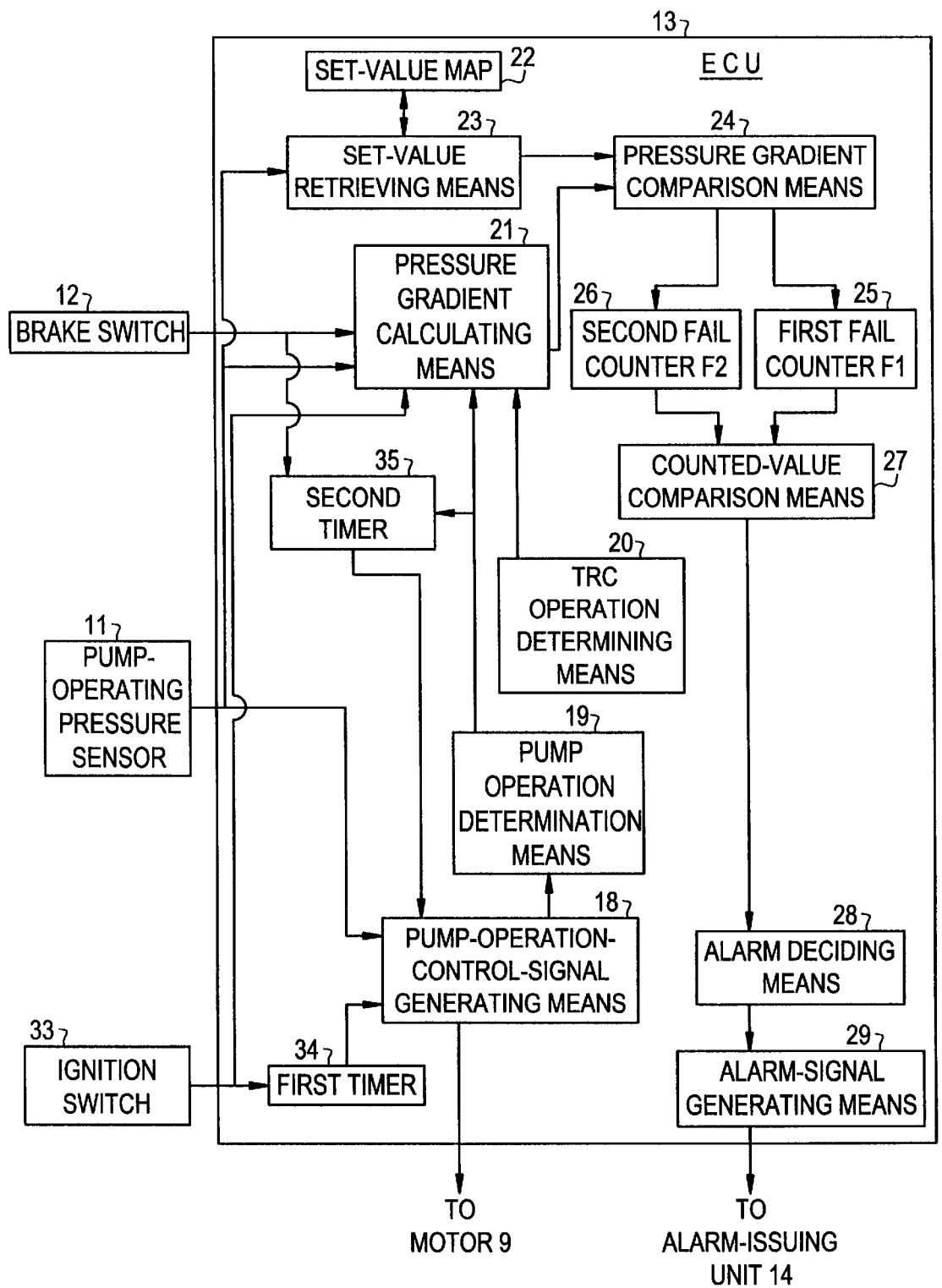
FIG. 11 is a diagram showing a fifth embodiment of the present invention.

FIG. 11 s a diagram showing a fifth embodiment of the present invention similarly to FIG. 2.

As shown in FIG. 11, an abnormal condition detecting apparatus according to the fifth embodiment incorporates an ignition switch 33; a first timer 34 for starting counting time when the ignition switch 33 has been switched on; and a second timer 35 for starting counting time when the pump 8 has been operated. After time T1 which is measured by the first timer 34 has elapsed from a moment at which the ignition switch 33 has been switched on, the pump 8 is operated for predetermined time T2 which is measured by the second timer 35. During the operation of the pump, the determination of an abnormal condition according to the first embodiment and arranged to be performed during the operation of the pump is performed. After the operation of the pump 8 has been interrupted, the determination of an abnormal condition which is performed when the pump is not being operated is performed. Moreover, the determination of an abnormal condition which is performed during the operation of the pump and the determination of an abnormal condition which is performed during interruption of the pump are performed at predetermined time intervals T1.

Figure 12A:
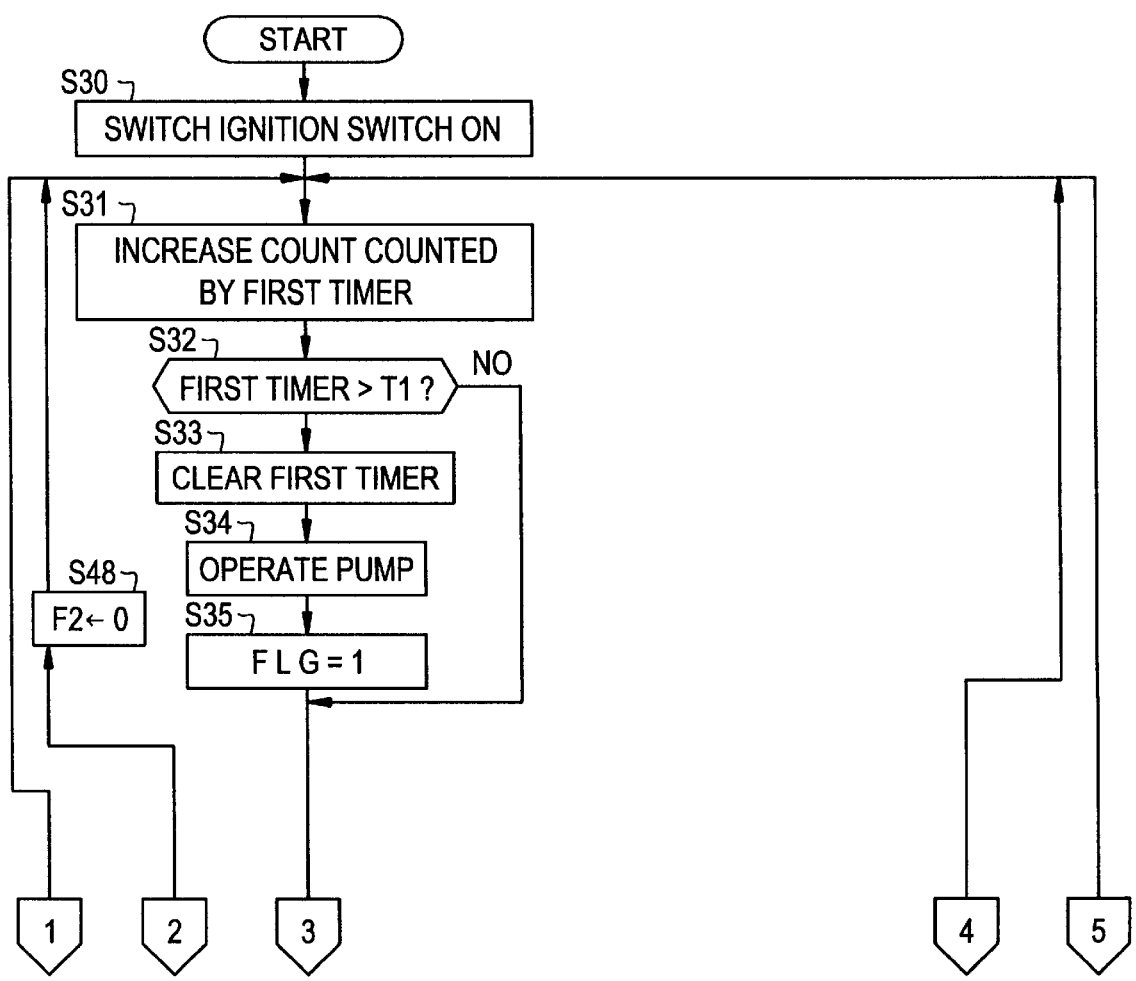
FIG. 12 is a flow chart for performing detection of an abnormal condition according to the fifth embodiment of the present invention.
Figure 12B:
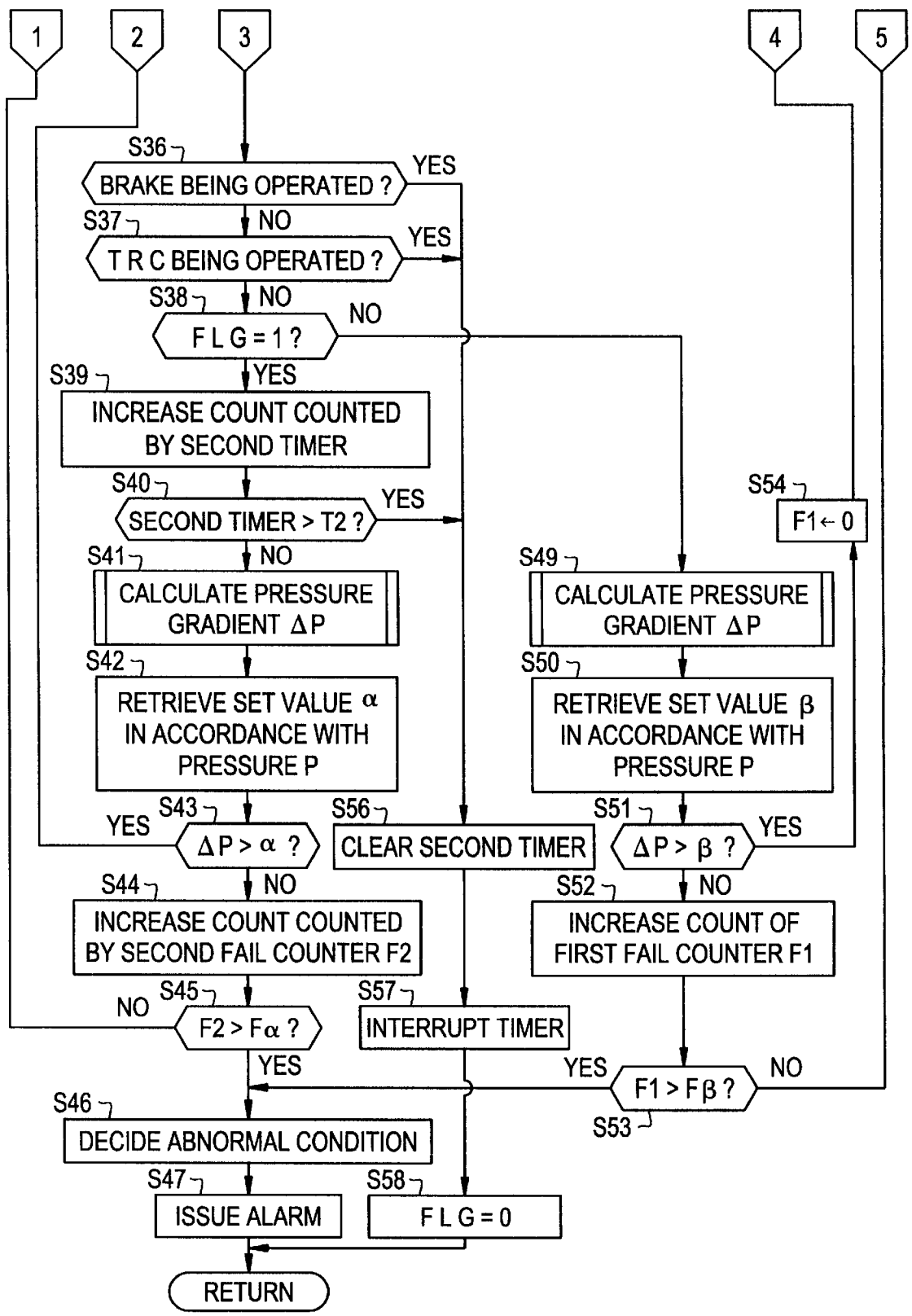

The determination of an abnormal condition according to the fifth embodiment is performed in accordance with a flow chart shown in FIG. 12. When the ignition switch 33 has been switched on in step S30, the first timer 34 starts measuring time in step S31. In step S32 whether or not time measured by the first timer 34 is longer than the predetermined time interval T1 is determined. If a determination is made that the measured time is longer than the predetermined time interval T1, time measured by the first timer 34 is cleared in step S33. In step S34 the pump 8 is operated, and a flag (FLG) is set to be 1 in step S35.

In step S36 whether or not the brake is being operated is determined. If a determination is made that the brake is not being operated, whether or not the TRC has been operated is determined in step S37. If a determination is made that the TRC is not being operated, whether or not the flag is 1 is determined in step S38. If a determination is made that the flag is 1 (that is, if the pump is being operated), the second timer 35 starts counting time in step S39. In step S40 whether or not the time measured by the second timer 35 is longer than the predetermined time T2 is determined. If a determination is made that measured time is not longer than the predetermined time T2, the pressure gradient $\Delta P$ is calculated in step S41.

The following processes the above-mentioned step S41 for calculating the pressure gradient $\Delta P$ are the same as those in step S6 to step S11 shown in FIG. 4: step S42 for retrieving the set value $\alpha$ in accordance with the pressure P; step S43 for determining whether or not the pressure gradient $\Delta P$ is larger than the set value $\alpha$; step S44 in which the second fail counter 26 performing counting; step S45 for determining whether or not the value F2 counted by the second fail counter 26 is larger than the set counted value F$\alpha$; step S46 for deciding an abnormal condition; step S47 in which an alarm output process is performed; and step S48 in which the value F2 counted by the second fail counter 26 is cleared. Therefore, the same processes are omitted from description. After the counted value F2 has been cleared in step S48 and if a determination is made in step S45 that the counted value F2 is not larger than the set counted value F$\alpha$, the fifth embodiment has a structure that the operation is returned to step S31.

If a determination is made in step S38 that the flag is not 1 (that is, if the pump is not being operated), the pressure gradient $\Delta P$ is calculated in step S49.

The following processes which are performed after step S49 for calculating the pressure gradient $\Delta P$ are the same as step S12 to step S17 shown in FIG. 4: step S50 for retrieving the set value P in accordance with the pressure Pump; step S51 for determining whether or not the pressure gradient $\Delta P$ is larger than the set value $\Delta$; step S52 in which the first fail counter performs counting; step S53 for determining whether or not the counted value F1 counted by the first fail counter 25 is larger than the set counted value F1; and step S54 in which the counted value F1 counted by the second fail counter 26 is cleared. The same processes are omitted from description. After the counted value F1 has been cleared in step S54 and if a determination is made in step S53 that the counted value F1 is not larger than the set counted value F$\beta$, the fifth embodiment has a structure that the operation is returned to step S31.

If a determination is made in step S36 that the brake is being operated, if a determination is made in step S37 that the TRC is being operated and if a determination is made in step S40 that time measured by the second timer 35 is longer than the predetermined time T2, time measured by the second timer 35 is cleared in step S56. Moreover, the operation of the pump 8 is interrupted in step S57. In step S58 the flag is set to be zero, and the operation is returned to step S31.

The abnormal condition detecting apparatus according to the fifth embodiment has the structure that the determination of an abnormal condition is always performed at predetermined time intervals T1 when the ignition switch 33 is being switched on. Therefore, an abnormal condition can reliably be detected.

The foregoing fifth embodiment has the structure that the determination of an abnormal condition is performed at predetermined time intervals T1 regardless of the level of the hydraulic pressure accumulated in the accumulator 7 (pump discharge pressure) P. Since the braking operation is not adversely affected if the hydraulic pressure (pump discharge pressure) P accumulated in the accumulator 7 is high, a structure may be employed in which the determination of an abnormal condition is not performed. If the hydraulic pressure accumulated in the accumulator 7 is not higher than a predetermined level in a state, in which the ignition switch 33 is being switched on, the determination of an abnormal condition is performed at predetermined time intervals T1.

The other structures, operations and effects of the fifth embodiment are the same as those of the first embodiment.

Figure 13:
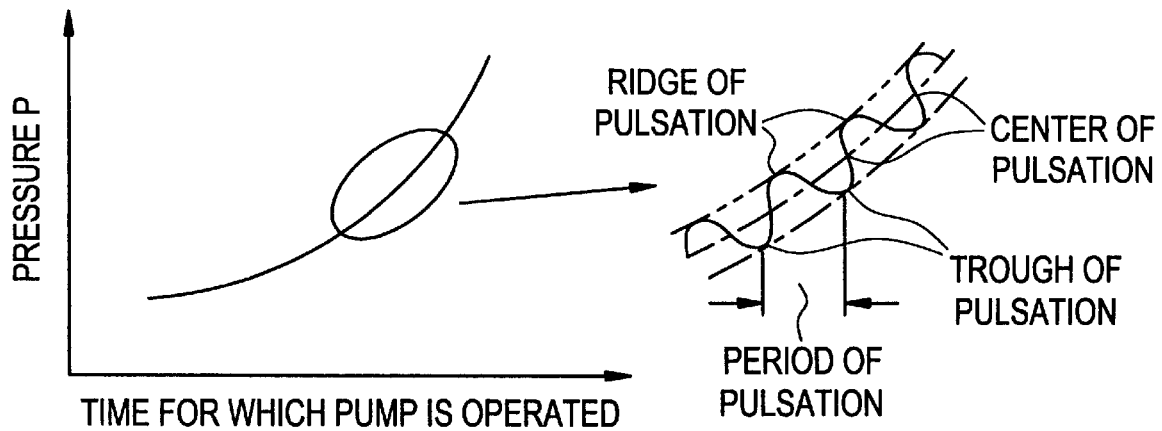
FIG. 13 is a diagram showing a method of extracting samples of pulsating frequencies.

Each of the above-mentioned embodiments has the structure that the hydraulic pressure accumulated in the accumulator 7 is extracted by the pump-operating pressure sensor 11. Since pulsation takes place during the operation of the pump 8 as shown in FIG. 13, an influence is exerted on the pressure gradient ΔP calculated in accordance with the value detected by the pump-operating pressure sensor 11. Therefore, extraction of the pressure which is performed by the pump-operating pressure sensor 11 is performed at positions which are multiples of the period (or the pulsating frequency) of the pulsation of the pump. Therefore, extraction is performed constantly at any one of the bottom portions, the ridge portions or the central portions of the pulsation. Therefore, the obtained pressure gradient ΔP is not affected by the pulsation so that the pressure gradient ΔP is furthermore accurately be obtained. Thus, the determination of an abnormal condition can furthermore accurately be performed.

Figure 14:
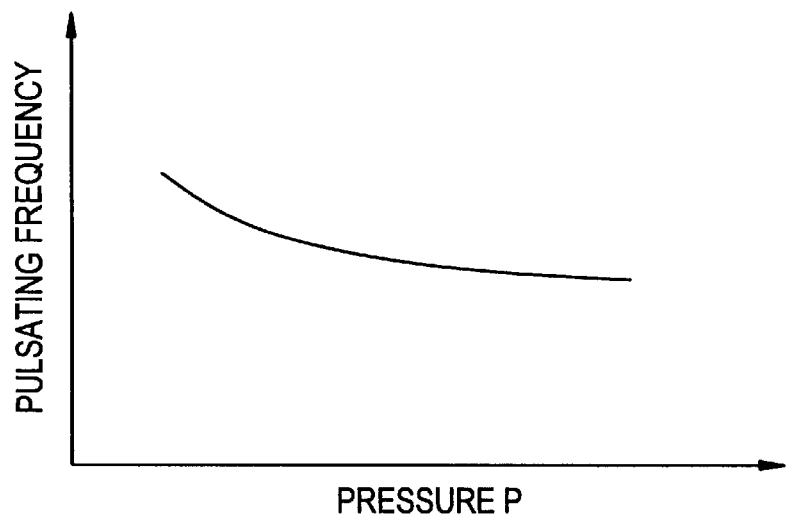
FIG. 14 is a graph showing the relationship between pressure levels and pulsating frequencies.

Since the pulsating frequency is changed by the pressure P as shown in FIG. 14, the cycles of the sampling operation which is performed by the pump-operating pressure sensor 11 may be changed in accordance with the pressure P.

Figure 15A:
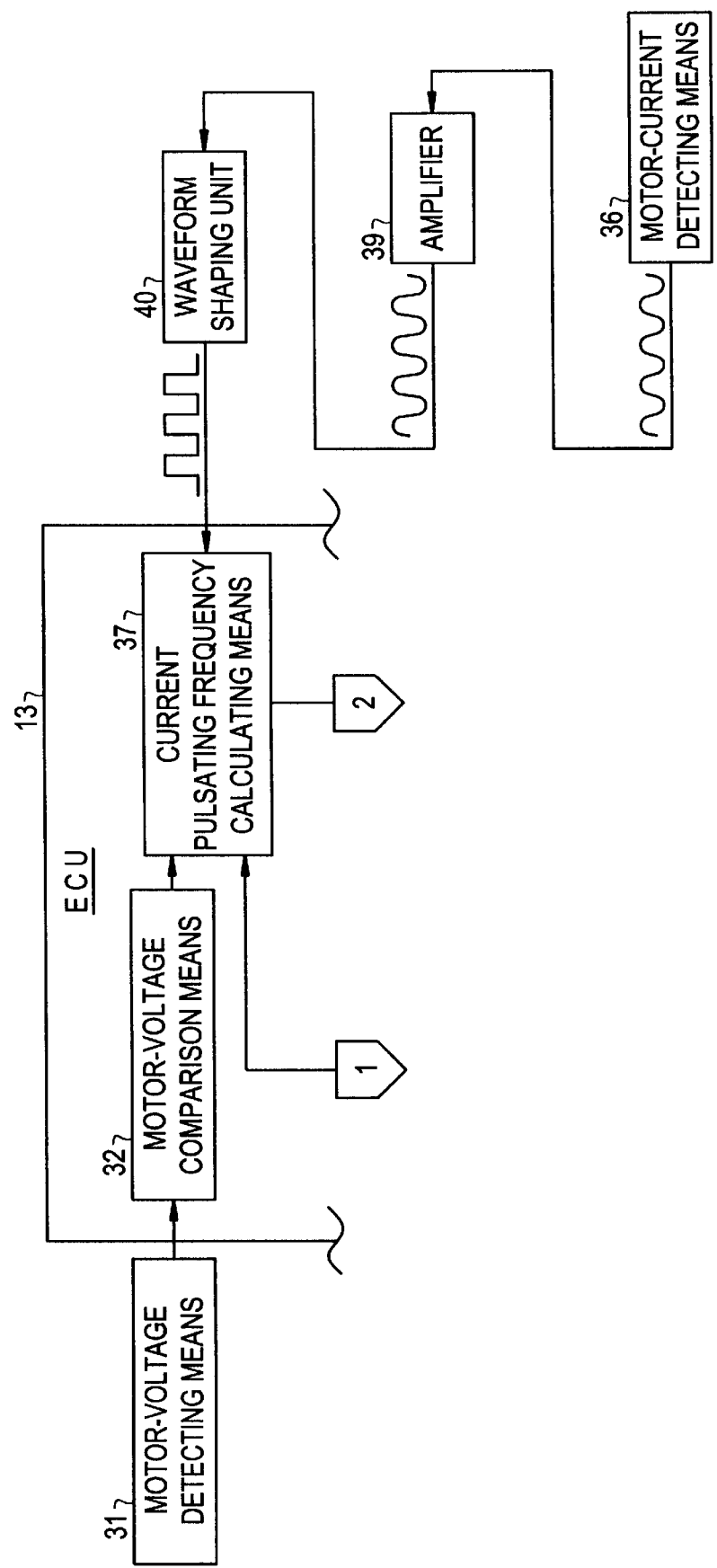
FIG. 15 is a diagram showing a sixth embodiment of the present invention.
Figure 15B:
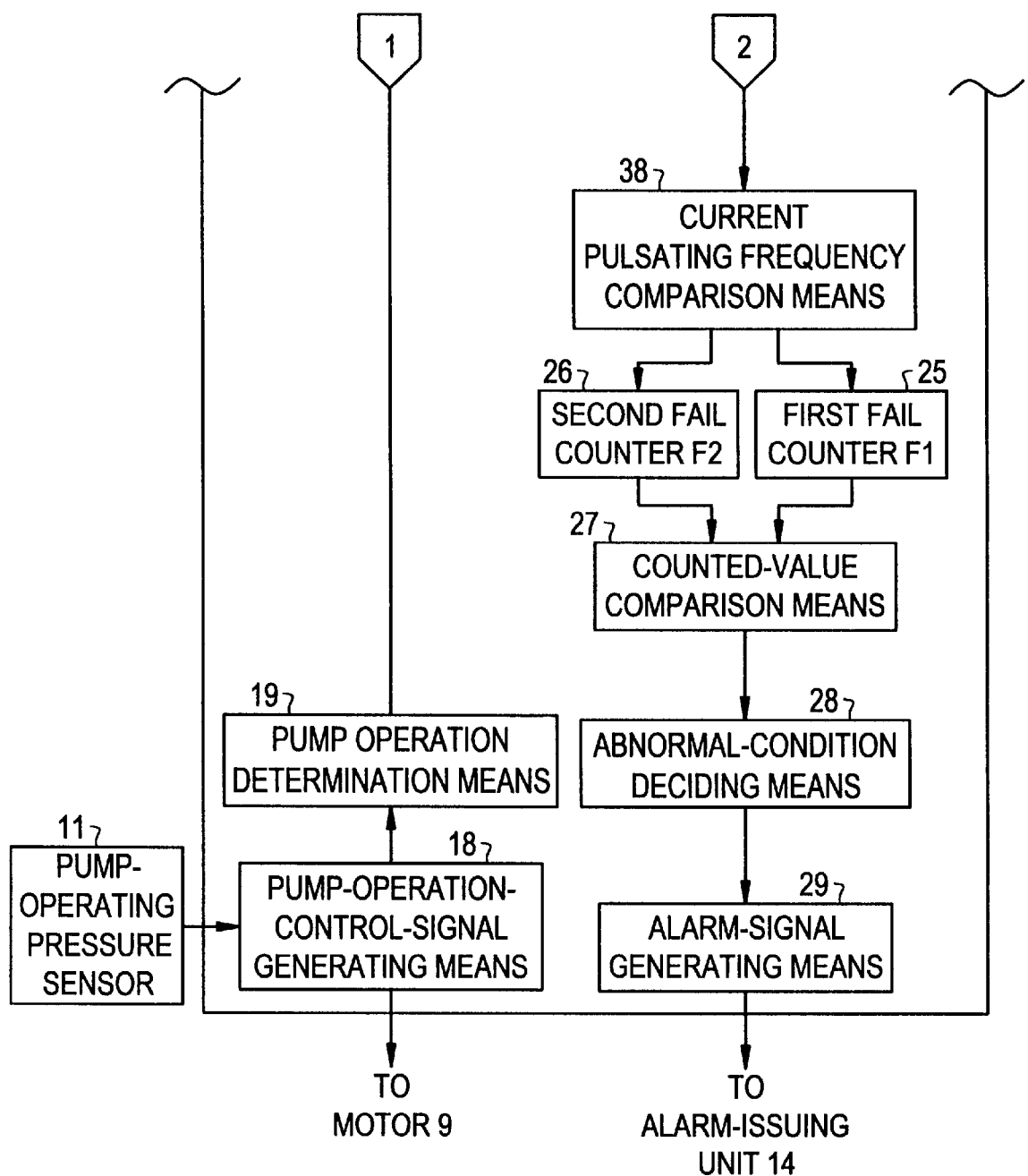

FIG. 15 is a diagram showing a sixth embodiment of the present invention similarly to FIG. 2.

As shown in FIG. 15, an abnormal condition detecting apparatus according to the sixth embodiment has a structure that an abnormal condition is determined if the voltage of the motor 9 is higher than a predetermined level and the pulsating frequency of an electric current of the motor 9 does not satisfy a set range. In this case, if a state in which the pulsating frequency does not satisfy the set range sequentially realized predetermined number of times, occurrence of an abnormal condition is decided.

Therefore, the foregoing pump-operating pressure sensor 11 and the motor-voltage detecting means 31 are provided, as shown in FIG. 15. Moreover, a motor-current detecting means 36 is provided. The ECU 13 is provided with the pump-operation-control-signal generating means 18, the pump operation determination means 19, first and second fail counters 25 and 26, the counted-value comparison means 27, the abnormal-condition deciding means 28, the alarm-signal generating means 29 and the motor-voltage comparison means 32. Moreover, there are provide a current-pulsating-frequency calculating means 37 for calculating pulsating frequency fA of an electric current of the motor in accordance with a detected current supplied from the motor-current detecting means 36 and a current pulsating-frequency comparison means 38 for producing an output when the calculated pulsating frequency fA of an electric current of the motor is smaller than the set value α. The detection signal representing the electric current of the motor and detected by the motor-current detecting means 36 is amplified by the amplifier 39, and then shaped into a rectangular wave so as to A be supplied to the current-pulsating-frequency calculating means 37.

Figure 16:
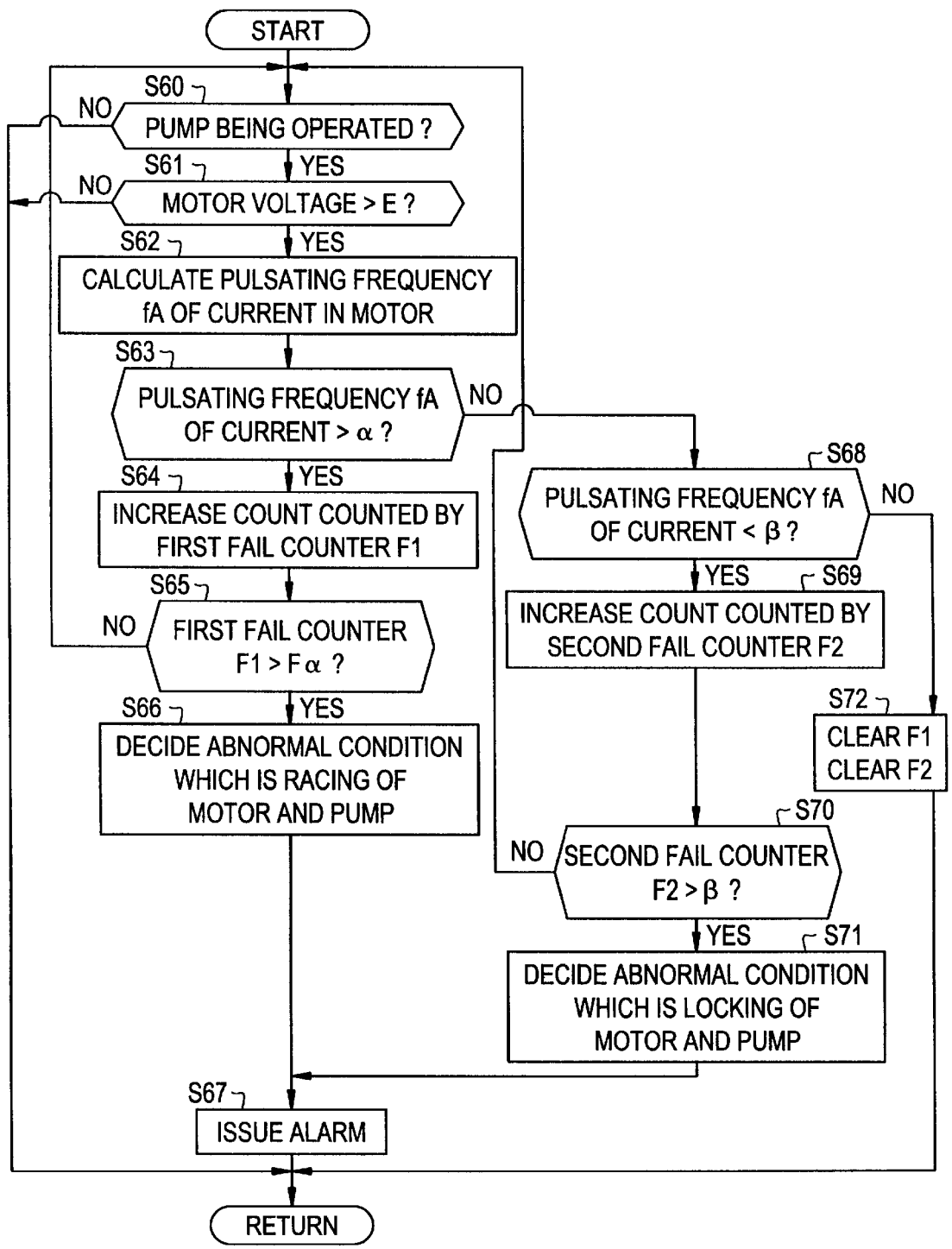
FIG. 16 is a flow chart for performing detection of an abnormal condition according to the sixth embodiment of the present invention.

FIG. 16 is a flow chart of a process for determining an abnormal condition according to the sixth embodiment.

As shown in FIG. 16, whether or not the pump 8 is being operated is determined in step S60. If a determination is made that the pump 8 is being operated, whether or not the voltage of the motor is higher than a predetermined level is determined in step S61. If a determination is made that the voltage of the motor is higher than the predetermined level, the pulsating frequency fA of an electric current is calculated in step S62. In step S63 whether or not the pulsating frequency fA of an electric current is higher than the set level α is determined. If a determination is made that the pulsating frequency fA of an electric current is higher than the set level α, the first fail counter 25 starts counting in step S64. In step S65 whether or not the counted value F1 counted by the first fail counter 25 is larger than the set counted value Fα is determined. If a determination is made that the counted value F1 is larger than the set counted value Fα, occurrence of an abnormal condition is decided in step S66. If the pulsating frequency fA of an electric current of the motor is larger than the set level α, the number of revolutions of the motor has excessively be enlarged. Therefore, the abnormal condition in this case of racing of the motor 9 and the pump 8. Thus, an alarm signal is transmitted in step S67, and then the alarm-issuing apparatus 14 issues an alarm. If a determination is made that the counted value F1 is not larger than the set level α, occurrence of an abnormal condition is not decided. In this case, the operation is returned to step S60.

If a determination is made in step S63 that the pulsating frequency fA of an electric current of the motor is not higher than the set level α, a determination is made in step S68 whether or not the pulsating frequency fA of an electric current is smaller than the set level β which is lower than the set level α. If a determination is made that the pulsating frequency fA of an electric current is lower than the set level β, the second fail counter 26 starts counting in step S69. In step S70 whether or not the counted value F2 counted by the second fail counter 26 is larger than the set counted value Fβ is determined. If a determination is made that the counted value F2 is larger than the set counted value F1, occurrence of an abnormal condition is decided in step S71. If the pulsating frequency fA of an electric current is lower than the set level β, the number of revolutions of the motor has excessively be reduced. Therefore, the above-mentioned abnormal condition is locking of the motor 9 and the pump 8. Then, the operation is shifted to step S67 so that an alarm signal is transmitted. Thus, the alarm-issuing apparatus 14 issues an alarm. If a determination is made that the counted value F2 is not larger than the set counted value Fβ, occurrence of an abnormal condition is not decided. Then, the operation is returned to step S60.

If a determination is made in step S68 that the pulsating frequency failure is not lower than the set level α, the pulsating frequency fA of an electric current of the motor satisfies a set range (β≧fA≧α). Therefore, a determination is made that the condition is in a normal state. In this case, both of the counted values F1 and F2 are cleared in step S72, and then the operation is returned to step S60.

The abnormal condition detecting apparatus according to the sixth embodiment has the structure that the pulsating frequency fA of an electric current of the motor is calculated. Therefore, abnormal conditions such as racing or locking of the motor 9 or the pump 8 can easily be detected.

Figure 17A:
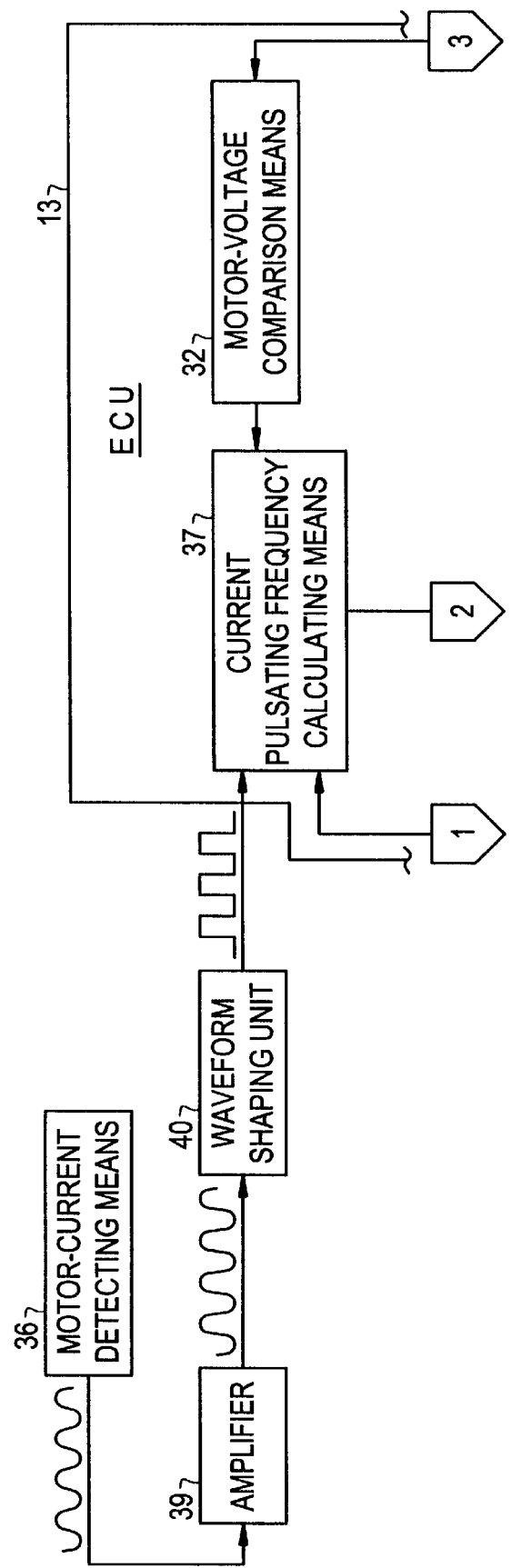
FIG. 17 is a diagram showing a seventh embodiment of the present invention.

FIG. 17 is a diagram showing a seventh embodiment of the present invention similarly to FIG. 15.

An abnormal condition detecting apparatus according to the seventh embodiment has a structure that the set values α and β which are subjected to comparisons with the pulsating frequency fA of an electric current of the motor are changed in accordance with the voltage of the motor 9. Therefore, the abnormal condition detecting apparatus-according to the seventh embodiment has a structure as shown in FIG. 17 that the ECU 13 is provided with a memory 41 having set values α and β previously set in accordance with the voltages of the motor; and a set-value (values α and β) retrieving means 42 for retrieving set values α and β corresponding to the voltage of the motor, the foregoing elements being provided in addition to the structure according to the sixth embodiment.

Figure 18:
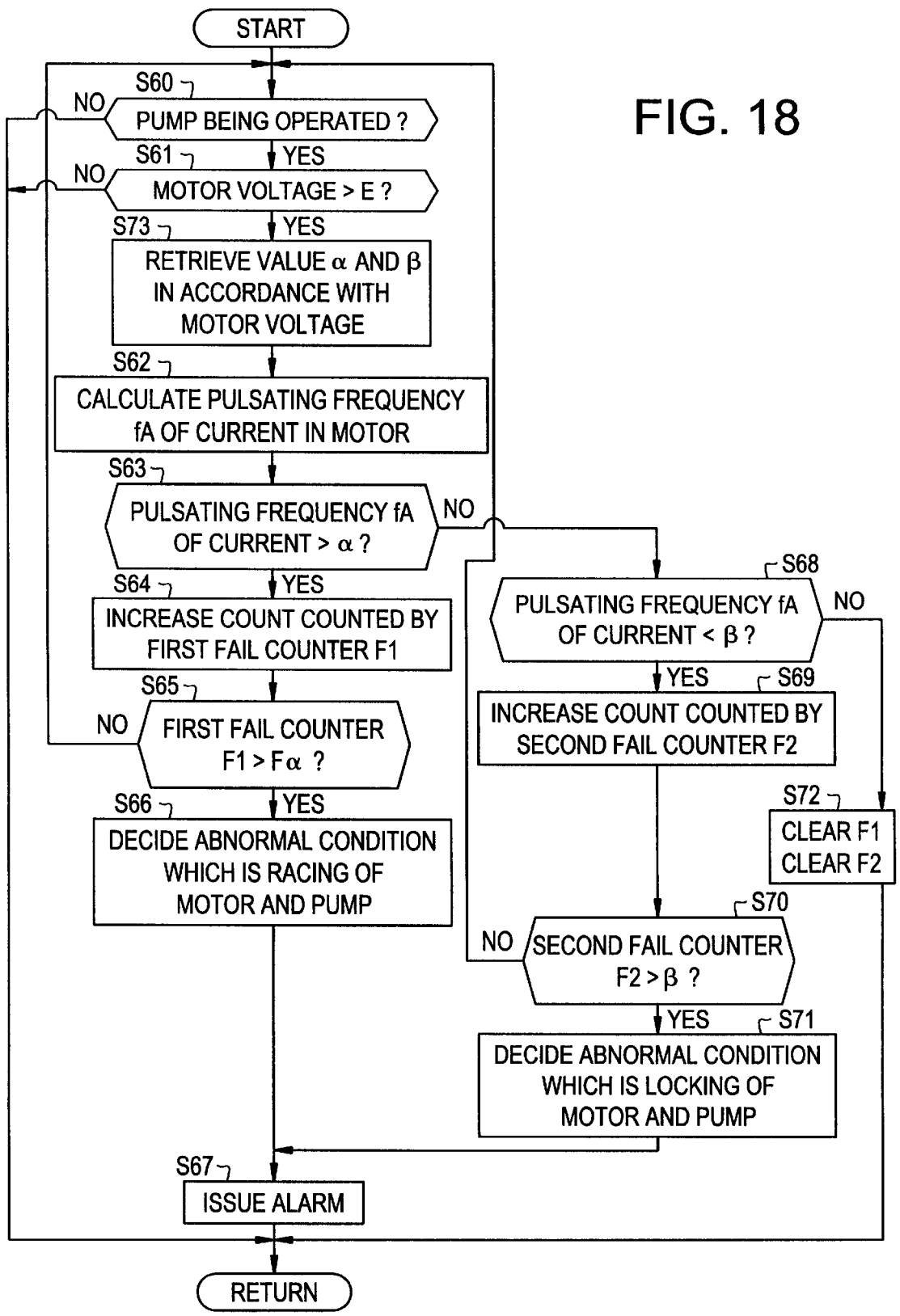
FIG. 18 is a flow chart for performing detection of an abnormal condition according to the seventh embodiment of the present invention.

A flow chart for performing the determination of an abnormal condition according to the seventh embodiment has a structure as shown in FIG. 18 and formed such that step S73 for performing a process for retrieving values α and β in accordance with the voltage of the motor is disposed between step S61 and step S62 in the flow (see FIG. 16) according to the sixth embodiment.

The abnormal condition detecting apparatus according to the seventh embodiment has the structure that the pulsating frequency fA of an electric current is subjected to comparison with the set values α and β which are changed in accordance with the voltage of the motor. Therefore, detection of an abnormal condition can furthermore precisely and accurately be performed.

The other structures, operations and effects of the seventh embodiment are the same as those of the sixth embodiment.

Figure 19:
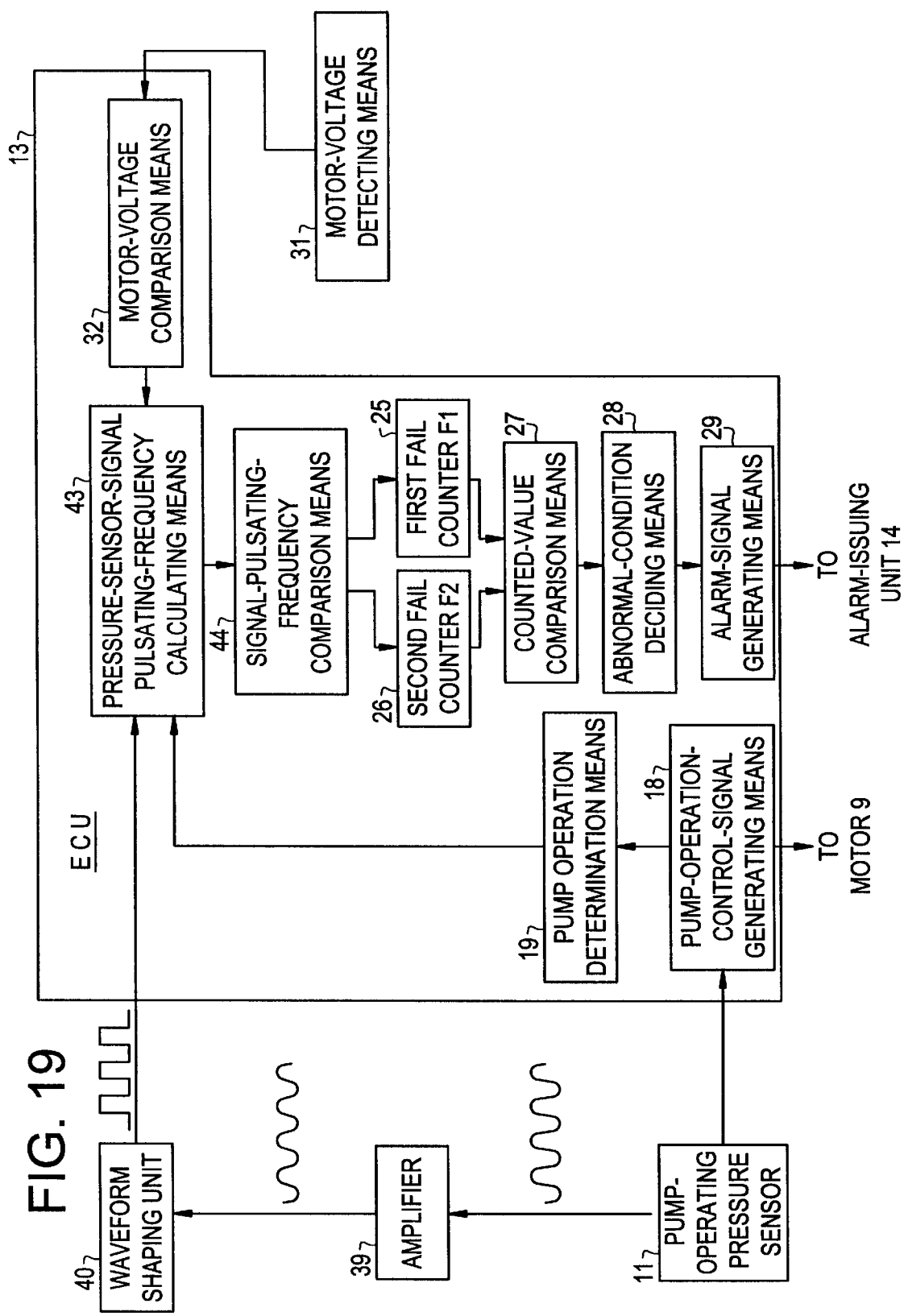
FIG. 19 is a diagram showing an eighth embodiment of the present invention.

FIG. 19 is a diagram showing an eighth embodiment of the present invention similarly to FIG. 15.

The sixth embodiment shown in FIG. 15 has the structure that the determination of an abnormal condition is performed in accordance with the pulsating frequency fA of an electric current of the motor 9. The abnormal condition detecting apparatus according to the eighth embodiment has the structure that the pulsating frequency fA of an electric current of the motor 9 is replaced by pulsating frequency fβ of a pressure sensor signal of the pump-operating pressure sensor 11 to perform determination of an abnormal condition. That is, if the voltage of the motor 9 is higher than a predetermined level and the pulsating frequency of the detection signal obtained from the pump-operating pressure sensor 11 does not satisfy the set range, occurrence of an abnormal condition is determined.

To detect an abnormal condition as described above, the abnormal condition detecting apparatus according to the eighth embodiment has a structure that the motor-current detecting means 36 according to the sixth embodiment is omitted. Moreover, the current-pulsating-frequency calculating means 37 and the current-pulsating-frequency comparison means 38 according to the sixth embodiment are replaced by a pressure-sensor-signal pulsating-frequency calculating means 43 and a signal pulsating-frequency comparison means 44 as shown in FIG. 19. A pressure detection signal obtained from the pump-operating pressure sensor 11 is amplified by the amplifier 39. Then, the waveform is shaped by a wave shaping unit 40. Then, the amplified and shaped signal is supplied to a pressure-sensor-signal pulsating-frequency calculating means 43.

Figure 20:
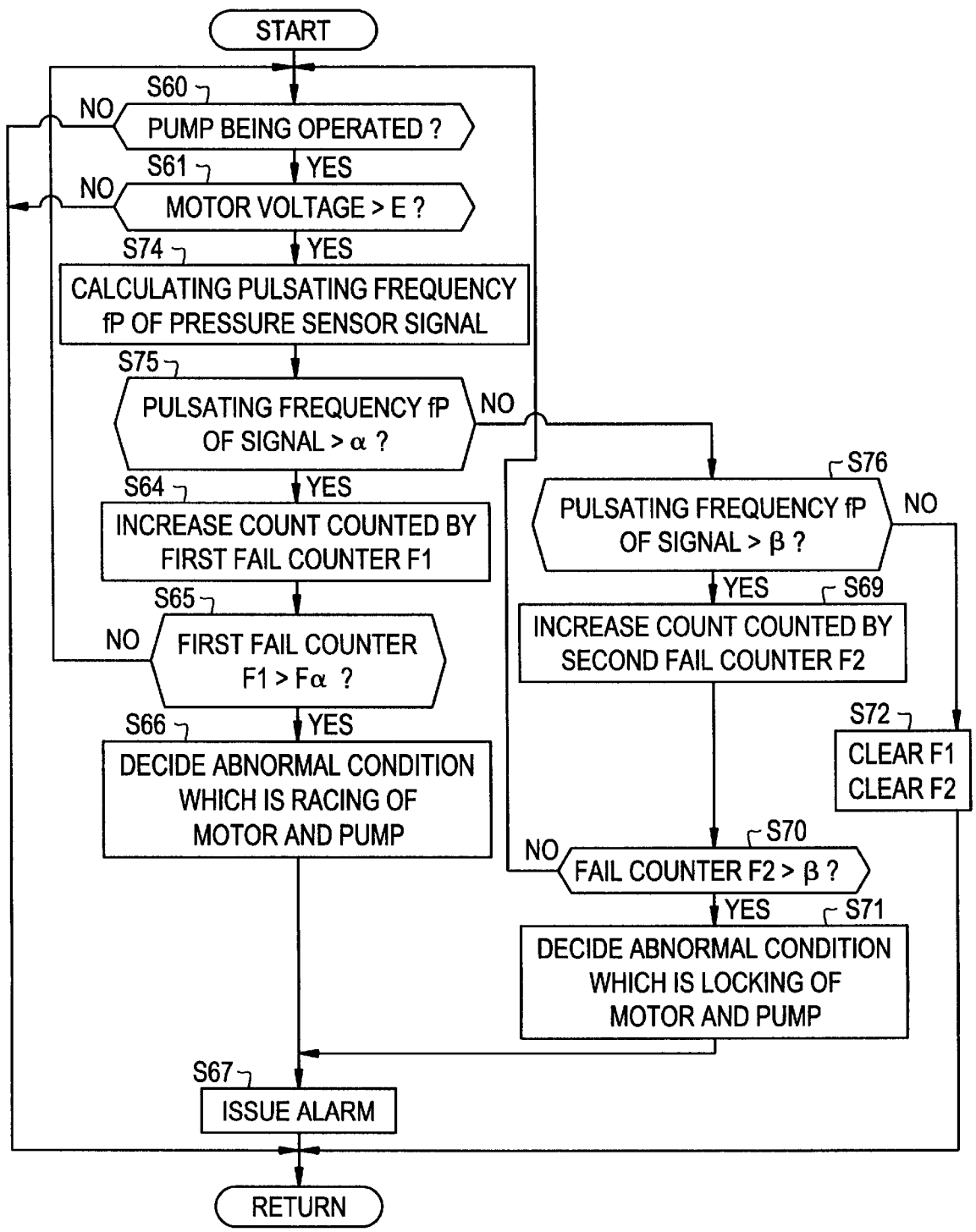
FIG. 20 is a flow chart for performing detection of an abnormal condition according to the eighth embodiment of the present invention.

A flow chart for detecting an abnormal condition according to the eighth embodiment has a structure that the following steps in the flow chart according to the sixth embodiment shown in FIG. 16 are omitted: step S62 for calculating the pulsating frequency fA of an electric current of the motor; step S63 for subjecting the pulsating frequency fA of an electric current and the set level α to a comparison to make a determination; and step S68 for subjecting the pulsating frequency fA of an electric current and the set level β to a comparison to make a determination. all Moreover, as shown in FIG. 20, the following steps are provided: step S47 for calculating pulsating frequency fp of the pressure sensor signal; step S75 for subjecting the pulsating frequency fp and the set level α to a comparison to make a determination; and step S76 for subjecting the pulsating frequency fp and the set level β to a comparison to make a determination.

The abnormal condition detecting apparatus according to the eighth embodiment has the structure that the pulsating frequency fp of the detection signal obtained from the pump-operating pressure sensor 11 is calculated. Thus, abnormal conditions such as racing and locking of the motor 9 and the pump 8 can easily be detected.

The other structures, operations and effects of the eighth embodiment are the same as those of the sixth embodiment.

Figure 21:
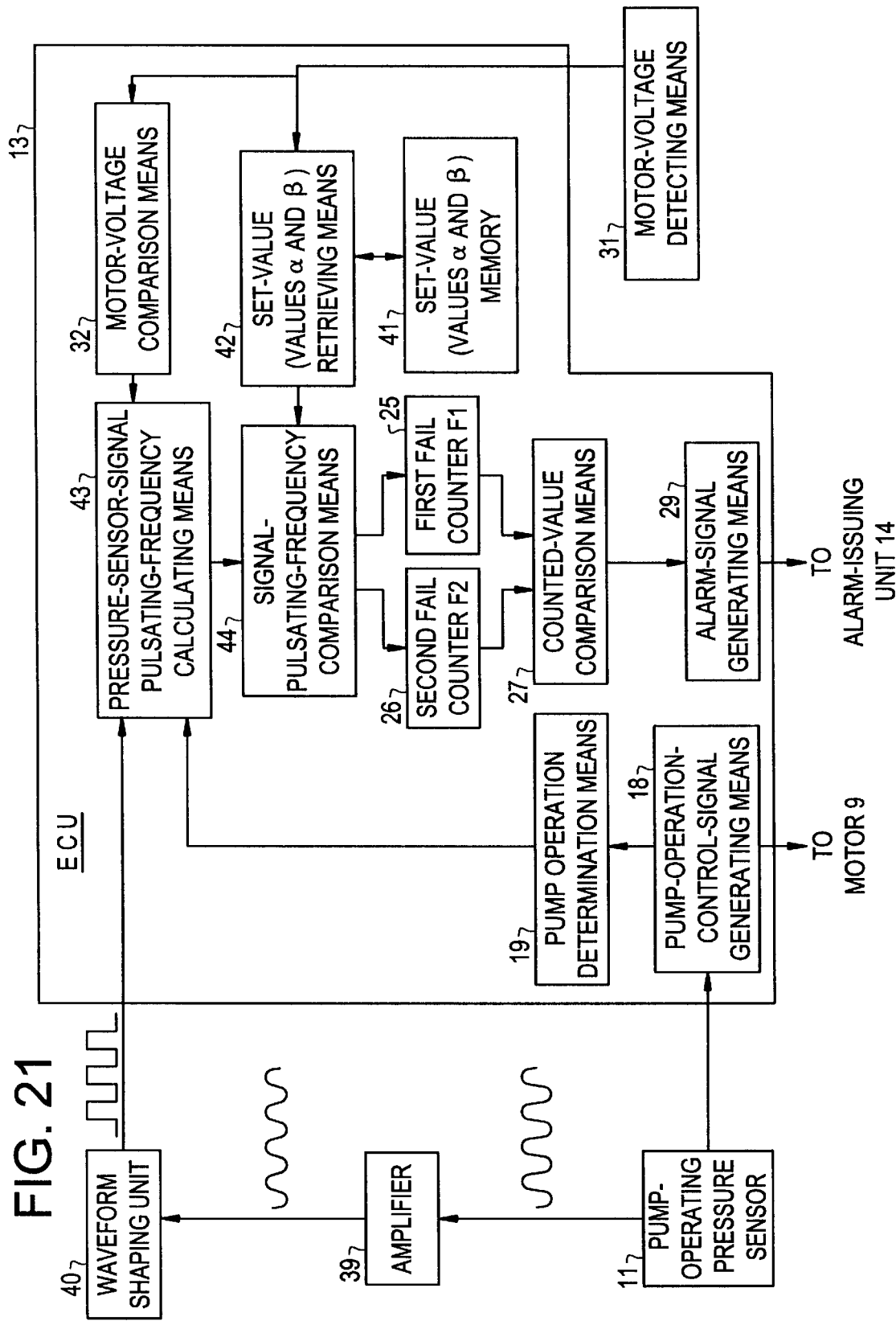
FIG. 21 is a diagram showing a ninth embodiment of the present invention.

FIG. 21 is a diagram showing a ninth embodiment of the present invention similarly to FIG. 15.

An abnormal condition detecting apparatus according to the ninth embodiment has the structure that the set values α and β which are subjected to comparisons with the pulsating frequency fp of the pressure sensor signal are changed in accordance with the voltage of the motor 9 similarly to the seventh embodiment. Therefore, the memory 41 and the set-value (values α and β) retrieving means 42 similar to those according to the seventh embodiment are provided, as shown in FIG. 21.

Figure 22:
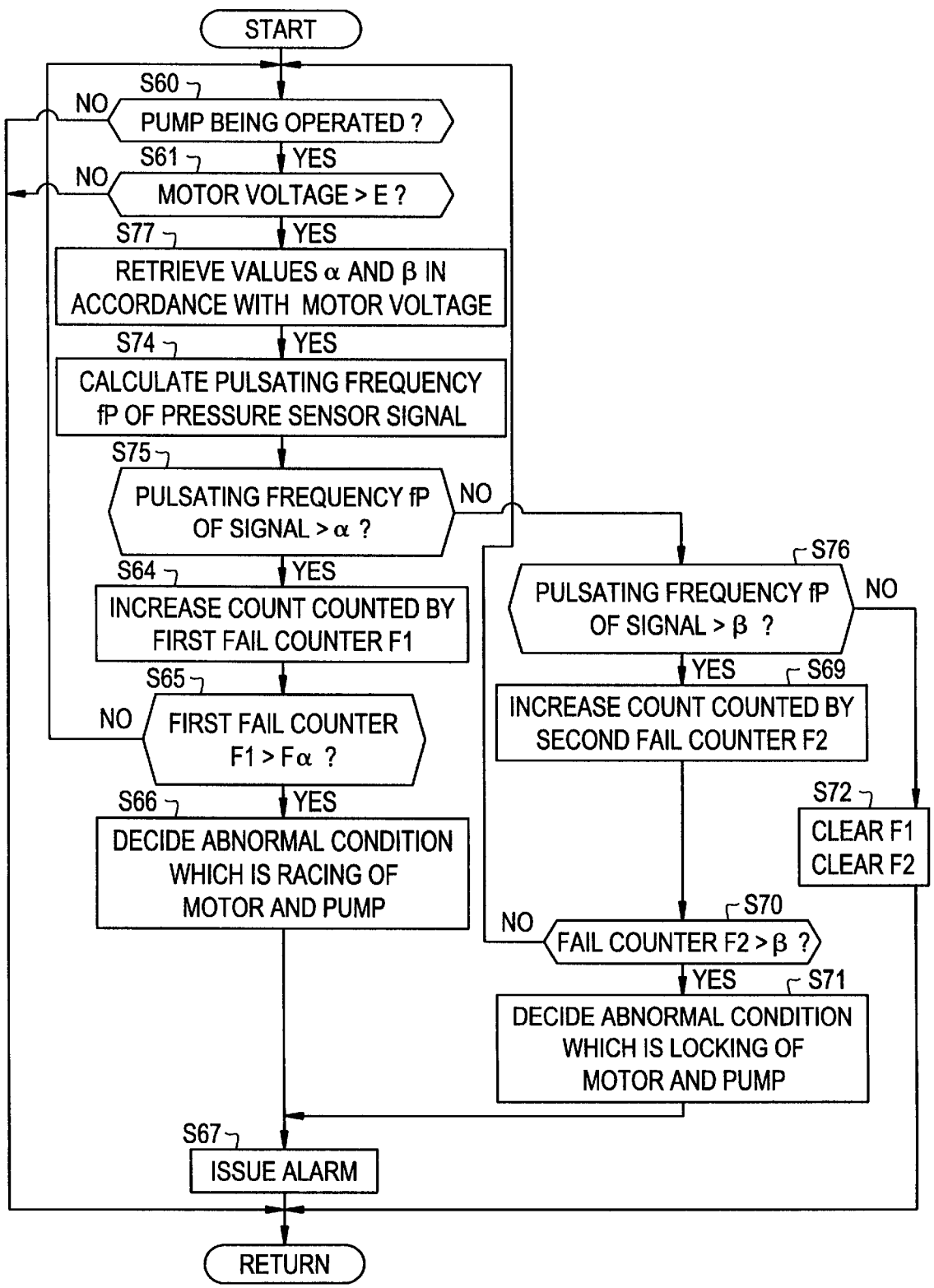
FIG. 22 is a flow chart for performing detection of an abnormal condition according to the ninth embodiment of the present invention.

A flow chart for detecting an abnormal condition according to the ninth embodiment has a structure that the following steps in the flow according to the eighth embodiment and shown in FIG. 18 are omitted: step S62 for calculating the pulsating frequency fA of an electric current of the motor; step S63 for subjecting the pulsating frequency fA of an electric current and the set level α to a comparison to make a determination; and step S68 for subjecting the pulsating frequency fA of an electric current and the set level β to a comparison to make a determination. As shown in FIG. 22, there are provided step S74 for calculating the pulsating frequency fp of the pressure sensor signal; step S75 for subjecting the pulsating frequency fp of the signal and the set level α to a comparison to make a determination; and step S76 for subjecting the pulsating frequency fp of the signal and the set level α to a comparison to make a determination.

The abnormal condition detecting apparatus according to the ninth embodiment has the structure that the pulsating frequency fp of the pressure sensor signal is subject to the set values α and β which are changed in accordance with the voltage of the motor. Therefore, detection of an abnormal condition can furthermore precisely and accurately be performed.

The other structures, operations and effects of the ninth embodiment are the same as those of the seventh embodiment.

The abnormal condition detecting apparatuses according to the sixth to ninth embodiments have the structure that when either of the pulsating frequency fA of an electric current of the motor 9 or the pulsating frequency fp of the pressure sensor signal does not satisfy a set value, occurrence of an abnormal condition is determined. The number of revolutions of the motor 9 or an electric current of the motor 9 may be employed to determine occurrence of an abnormal condition if the number of revolutions or the electric current of the motor 9 does not satisfy the set value.

Figure 23A:
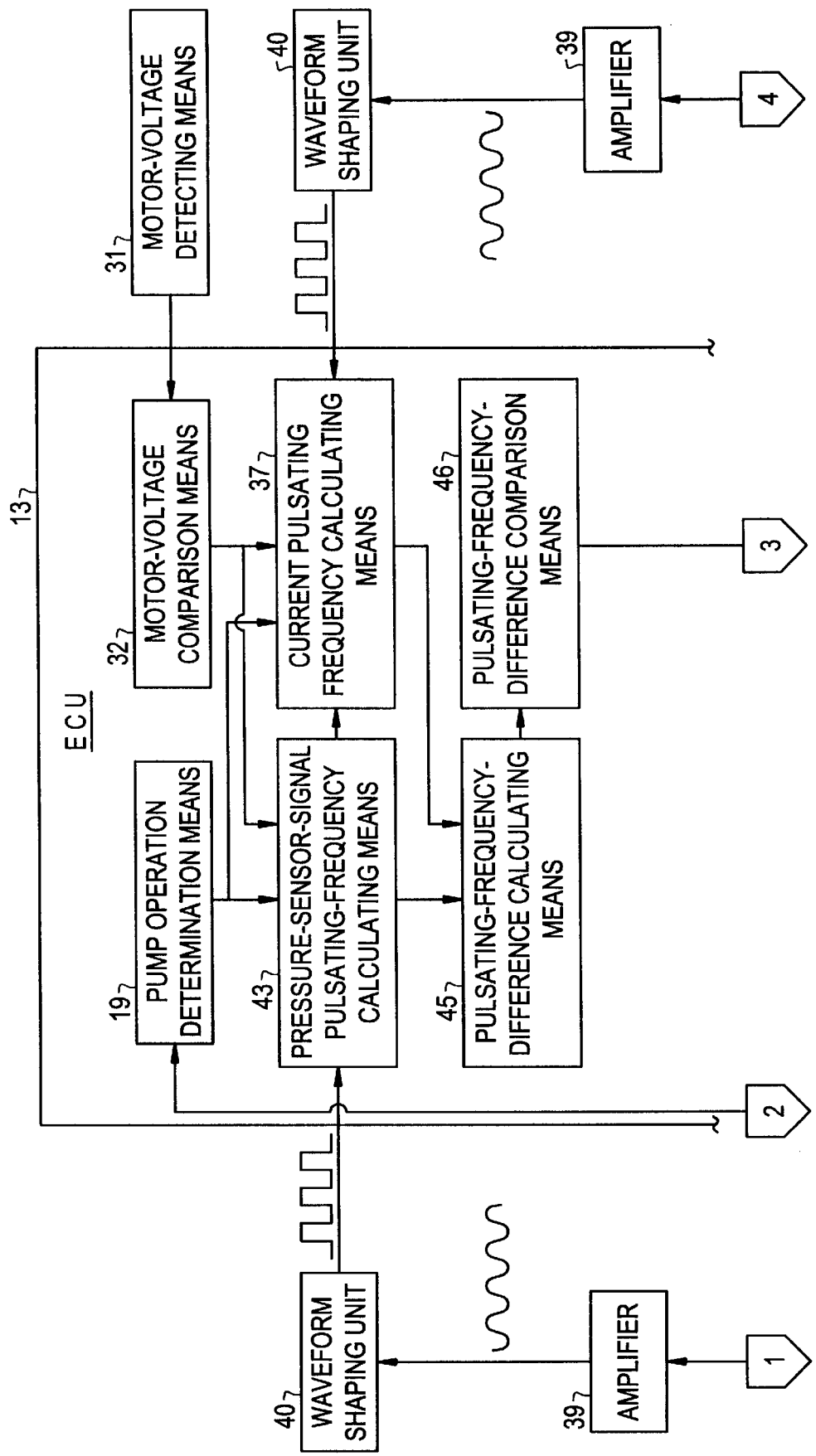
FIG. 23 is a diagram showing a tenth embodiment of the present invention.
Figure 23B:
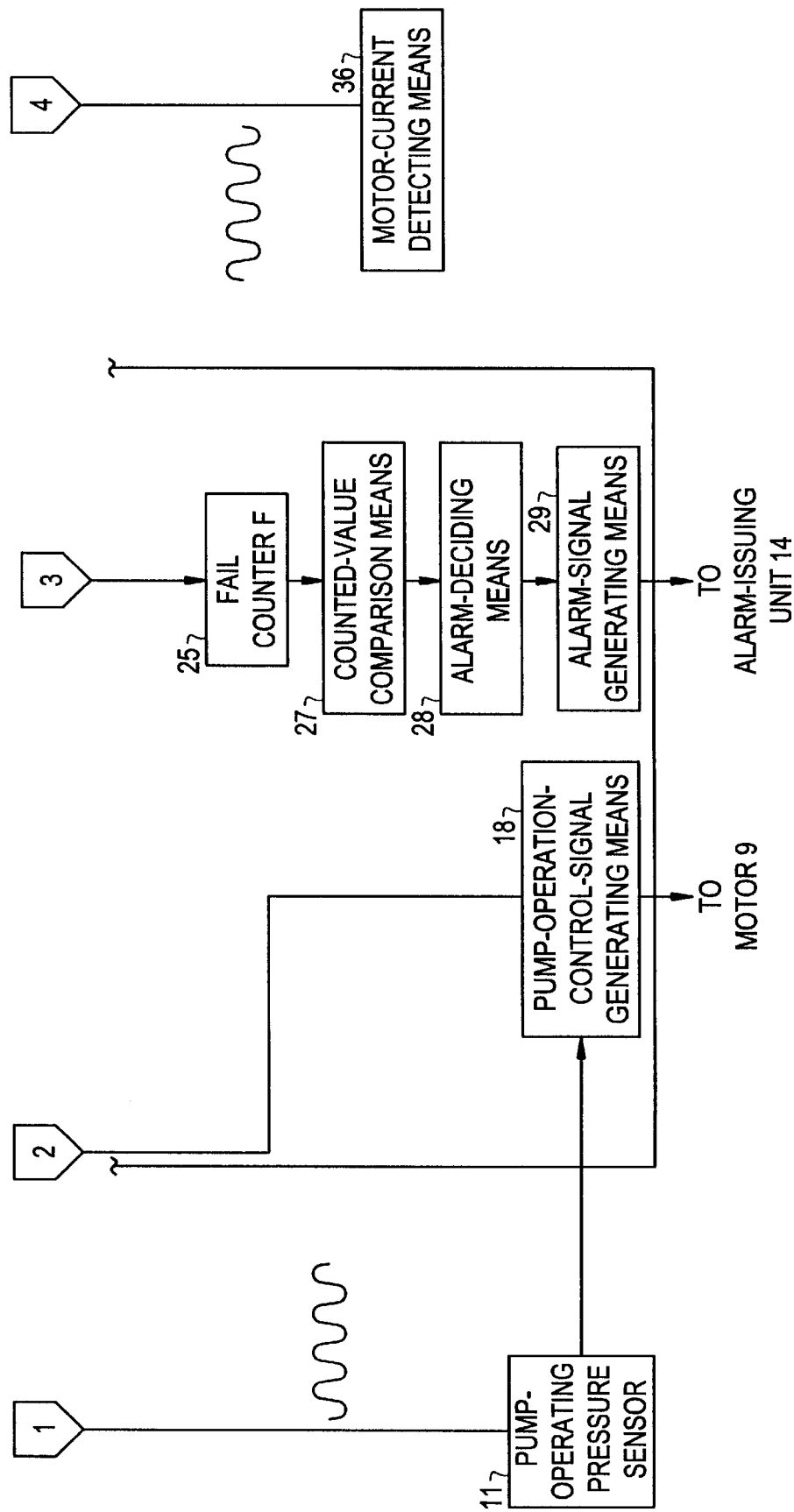

FIG. 23 is a diagram showing a tenth embodiment of the present invention.

If the pump 8, the motor 9 and the sensors are in a normal state, the pulsating frequency fp of the pressure sensor signal and the pulsating frequency fA of an electric current of the motor 9 are included in detection error ranges set for the detection means 11 and 36 and the pulsating frequency fp and the pulsating frequency fA of an electric current are made to be substantially the same. If the difference between the pulsating frequencies fp and fA exceeds a predetermined value, the abnormal condition detecting apparatus according to the tenth embodiment has a structure that a determination is made that at least any one of the pump 8, the motor 9 and the sensors has encountered an abnormal condition.

As shown in FIG. 23 and similarly to the above-mentioned embodiments, the abnormal condition detecting apparatus according to the tenth embodiment incorporates the pump-operating pressure sensor 11, the pump-operation-control-signal generating means 18, the pump operation determination means 19, the first fail counter 25, the counted-value comparison means 27, the abnormal-condition deciding means 28, the alarm-signal generating means 29, the motor-voltage detecting means 31, the motor-voltage comparison means 32, the motor-current detecting means 36, the current-pulsating-frequency calculating means 37, the amplifier 39, the shaping unit 40 and the pressure-sensor-signal pulsating-frequency calculating means 43. Moreover, the apparatus according to this embodiment incorporates a pulsating-frequency-difference calculating means 45 for calculating the difference between the two frequencies fp and fA; and a pulsating-frequency-difference comparison means 46 for producing an output if the difference in the pulsating frequency between the two pulsating frequencies fp and fA is larger than a predetermined value α.

Figure 24:
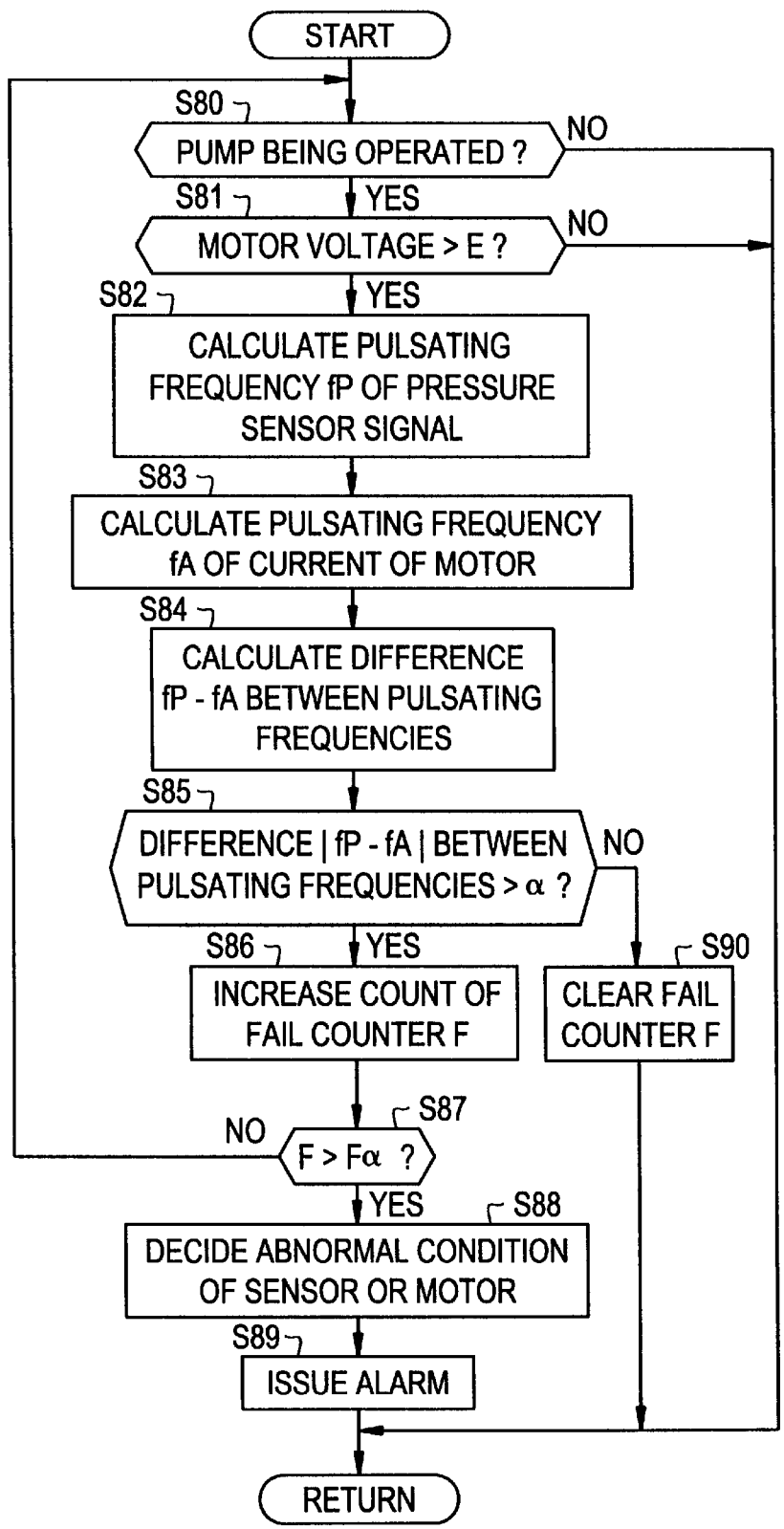
FIG. 24 is a flow chart for performing detection of an abnormal condition according to the tenth embodiment of the present invention.

The determination of an abnormal condition according to the tenth embodiment is performed in accordance with a flow chart shown in FIG. 24. That is, similarly to the above-mentioned embodiments, if a determination is made in step S80 that the pump 8 is being operated and if a determination is made in step S81 that the voltage of the motor is higher than a predetermined level E, the pulsating frequency fp of the pressure sensor signal is calculated in step S82. Moreover, the pulsating frequency fA of an electric current of the motor is calculated in step S83. In step S84 the difference between the pulsating frequency fp of the pressure sensor signal and the pulsating frequency fA of an electric current of the motor is calculated. In step S85 whether or not the absolute value of the difference (fp–fA) between the pulsating frequencies is larger than the predetermined value α is determined.

If a determination is made that the absolute value of the difference (fp–fA) between the pulsating frequencies is larger than the predetermined value α, the first fail counter 25 starts counting in step S86. In step S87 whether or not the counted value F is larger than the set counted value Fα is determined. If a determination is made that the counted value F is larger than the set counted value Fα, the abnormal condition of the sensor or the motor is decided in step S88. Moreover, an alarm signal is transmitted to the alarm-issuing apparatus 14 in step S89.

If a determination is made in step S87 that the counted value F is not larger than the set counted value Fα, occurrence of an abnormal condition is not decided. Thus, the operation is returned to step S80. If a determination is made in step S85 that the absolute value of the difference (fp–fA) between the pulsating frequencies is not larger than the predetermined value α, a determination is made that no abnormal condition is encountered. In step S90 the counted value F counted by the fail counter is cleared. Then, the operation is returned to step S80.

If a determination is made in step S80 that the pump 8 is not being operated or if a determination is made in step S81 that the voltage of the motor is not higher than the predetermined value E, the operation is as it is returned to step S80.

As described above, the abnormal condition detecting apparatus according to the tenth embodiment has the structure that the difference between the two pulsating frequencies fp and fA is monitored. Therefore, an abnormal condition of the sensor or the motor can easily be detected.

The other structure, operations and effects of the tenth embodiment are the same as those of the sixth and eighth embodiments.

The tenth embodiment has the structure that the difference between the pulsating frequency fp of the pressure sensor signal and the pulsating frequency fA of an electric current of the motor is used to detect an abnormal condition. The difference between the pulsating frequency of the motor and the pulsating frequency fp of the pressure sensor signal or the difference between the pulsating frequency of the motor and the pulsating frequency fA of an electric current of the motor may be employed to detect an abnormal condition.

Each determination of an abnormal condition according to the sixth to tenth embodiments may be structured such that the determination of an abnormal condition is not performed if the accumulated hydraulic pressure in the accumulator 7 is not lower than a predetermined level. As a result, unnecessary determination of an abnormal condition in a case where the hydraulic pressure is normally accumulated in the accumulator 7 can be prevented.

Each of the process for determining an abnormal condition according to the sixth to tenth embodiments may be structured such that the motor 9 is rotated at predetermined time intervals when the ignition switch 33 has been switched on so as to determine an abnormal condition. If the above-mentioned determination of an abnormal condition which is performed when the ignition switch is switched on is also performed in a state in which the hydraulic pressure accumulated in the accumulator 7 is higher than a predetermined level, an abnormal condition can be detected even if the hydraulic pressure accumulated in the accumulator 7 is not lower than the predetermined level. Therefore, an abnormal condition of the pump 8, the motor 9 or the sensors can early be detected. Although the fifth embodiment has the structure that the determination of an abnormal condition is not performed if the hydraulic pressure accumulated in the accumulator 7 is not lower than a predetermined level, also the fifth embodiment may be structured such that the determination of an abnormal condition is performed if the hydraulic pressure accumulated in the accumulator 7 is not lower than the predetermined level. Thus, an abnormal condition of the pump 8, the motor 9 or the sensors can early be detected.

Figure 25:
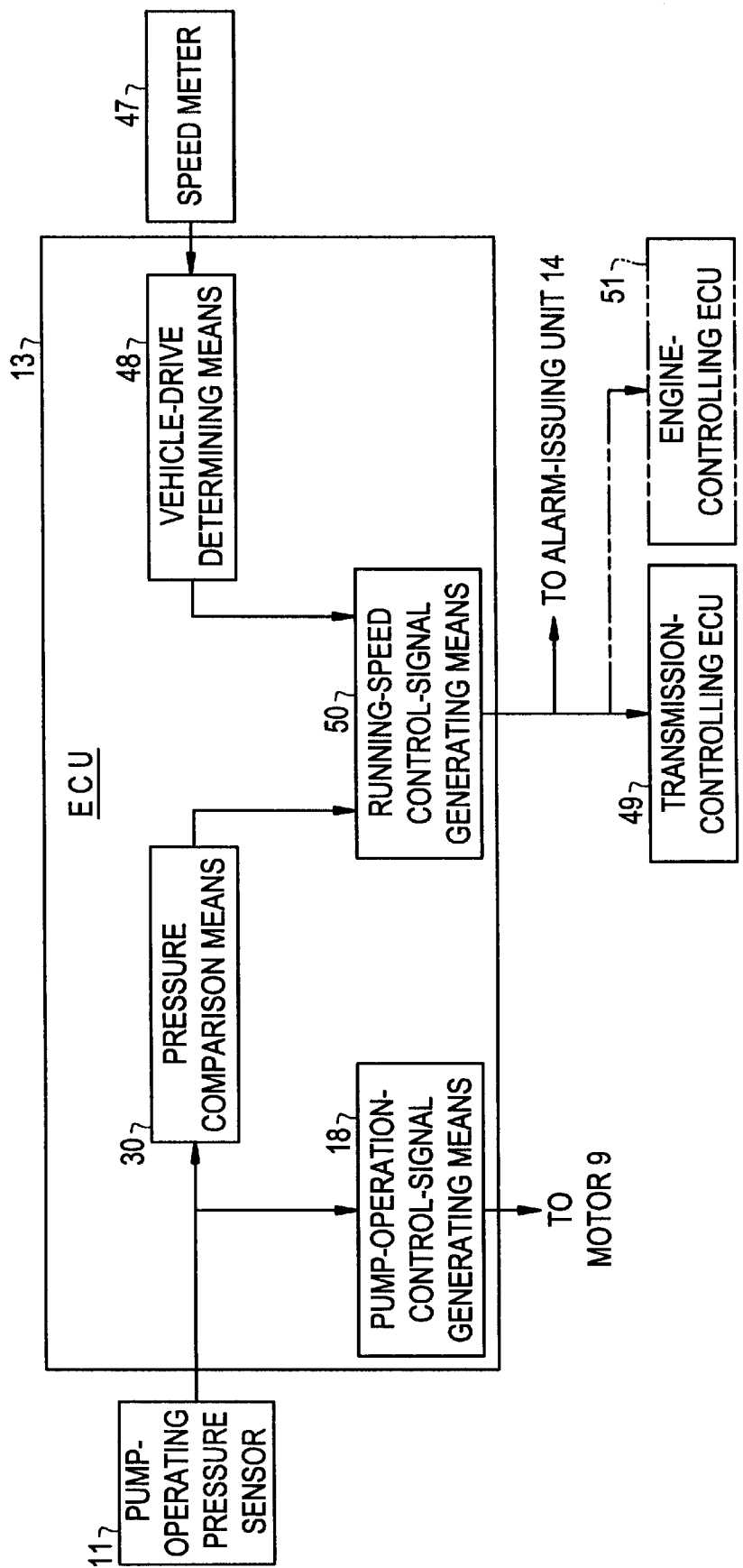
FIG. 25 is a diagram showing an eleventh embodiment of the present invention.

FIG. 25 is a diagram showing an eleventh embodiment of the present invention.

According to the eleventh embodiment, a safety unit for a hydraulic brake boosting system is provided which is operated when the hydraulic pressure accumulated in the accumulator 7 has excessively been lowered. If abnormal reduction in the accumulated hydraulic pressure in the accumulator 7 is detected, the pump 8 is operated. Moreover, the start of the stopped vehicle is inhibited and the abnormal condition is communicated.

As shown in FIG. 25, the safety unit according to the eleventh embodiment incorporates the pump-operating pressure sensor 11 and a speed meter 47. Moreover, the ECU 13 includes the pump-operation-control-signal generating means 18; a pressure comparison means 30 for determining whether or not the hydraulic pressure accumulated in the accumulator 7 is lower than a predetermined level; a vehicle-drive determining means 48 for determining whether or not the vehicle is being driven; and a running-speed control signal generating means 50 for transmitting, to a transmission-controlling ECU 49, a shift lock signal for inhibiting shifting.

The safety unit according to this embodiment has a structure that when the hydraulic pressure accumulated in the accumulator 7 has been made to be lower than pressure at which the operation of the pump 8 is started, the motor 9 and the pump 8 are operated in response to a pressure detection signal supplied from the pump-operating pressure sensor 11. The pressure detection signal supplied from the pump-operating pressure sensor 11 is supplied to the pressure comparison means 30. The pressure comparison means 30 subjects the hydraulic pressure accumulated in the accumulator 7 to a comparison with the set pressure level. If the pressure comparison means 30 determines that the hydraulic pressure accumulated in the accumulator 7 is lower than the set pressure level, the pressure comparison means 30 produces an output to the running-speed control signal generating means 50. On the other hand, a speed detection signal transmitted from the speed meter 47 is supplied to the vehicle-drive determining means 48. If the vehicle-drive determining means 48 determines that the vehicle is stopped in response to the speed detection signal, the vehicle-drive determining means 48 produces an output to the running-speed control signal generating means 50.

If the hydraulic pressure accumulated in the accumulator 7 is not higher than the set pressure level in the state where the vehicle is stopped, the running-speed control signal generating means 50 transmits a drive inhibition signal to the transmission-controlling ECU 49. In response to the drive inhibition signal, the transmission-controlling ECU 49 locks shifting to prevent the transmission being brought to a drive permitted position. Thus, start of the vehicle is inhibited.

If the hydraulic pressure accumulated in the accumulator 7 is not higher than the set level in a state in which the vehicle is being driven, the running-speed control signal generating means 50 transmits a maximum-speed limiting signal to the transmission-controlling ECU 49. In response to the maximum speed limiting signal, the transmission-controlling ECU 49 locks the transmission to the low-speed shift position. As a result, the maximum speed of the vehicle is limited to a level at which the vehicle can reliably be stopped when the braking operation is performed with the hydraulic pressure accumulated in the accumulator 7.

The safety unit arranged to perform limitation of the maximum speed enables the vehicle to be started even if the hydraulic pressure accumulated in the accumulator 7 is not higher than a set value and as well as the maximum speed to be limited.

As described above, the safety unit according to the eleventh embodiment has the structure that when the hydraulic pressure accumulated in the accumulator 7 is lower than a set pressure level, the vehicle cannot be driven or the maximum speed is limited. Therefore, safety can be improved even if the braking force is insufficient because the hydraulic pressure accumulated in the accumulator 7 has been lowered.

A structure may be employed in which the detection signal obtained from the pump-operating pressure sensor 11 is not supplied to the ECU 13. In this case, the detection signal is directly supplied to the transmission-controlling ECU 49.

The above-mentioned safety unit has the structure that shifting of the transmission is locked to control the drive of the vehicle. An output signal from the running-speed control signal generating means 50 may be introduced into a engine-controlling ECU 51 as indicated by an alternate long and two short dashes line. Thus, the operation of the engine is interrupted or an output from the engine is limited to inhibit start of the vehicle or limit the maximum speed.

When the abnormal condition detecting apparatus according to any one of the first to tenth embodiments has detected an abnormal condition and the alarm-signal generating means 29 has transmitted an alarm signal to the alarm-issuing apparatus 14, the alarm signal may be introduced into the transmission-controlling ECU 49 or the engine-controlling ECU 51. Thus, the start of the vehicle can be inhibited or the maximum speed can be limited.

All of the above-mentioned embodiments have the structure that the detection of the abnormal condition and the safety control are performed in response to the detection signal supplied from the pump-operating pressure sensor 11. The pump-operating pressure sensor 11 may be replaced by an alarm-issuing pressure sensor arranged to be operated when the hydraulic pressure accumulated in the accumulator 7 has excessively been lowered so as to issue an alarm. As an alternative to this, the pump-operating pressure sensor 11 also serving as the alarm-issuing pressure sensor may be employed.

As described above, the abnormal condition detecting apparatus according to the present invention has the structure that an abnormal condition is determined in accordance with the state of the pump discharge pressure, the hydraulic pressure in the accumulator or the state of the pulsation of the pump. Therefore, an abnormal condition can be detected in a wide range of the hydraulic pressure in the accumulator from a low pressure level to a high pressure level. Therefore, an alarm can be issued to communicate an abnormal condition to the driver before the braking force becomes insufficiently small because of unsatisfactory hydraulic pressure accumulated in the accumulator.

The abnormal condition detecting apparatus according to the present invention enables accurate determination of an abnormal condition to be performed and an incorrect determination of an abnormal condition to be prevented.

Since the present invention enables an abnormal condition to early be detected, insufficient reduction of the hydraulic pressure in the accumulator and excessive accumulation in the same which take place because of change in the characteristic of the sensor caused from deterioration in the sensor, an abnormal condition of the pump or that of the motor can be prevented. Therefore, deterioration of the durability of the pump, the motor, the accumulator and the like can be prevented. Moreover, insufficient reduction of the hydraulic pressure accumulated in the accumulator can reliably be prevented even after the vehicle has been allowed to stand for long time.

The abnormal condition detecting apparatus according to the present invention can be constituted by the elements for use in the conventional apparatus. Moreover, the costly alarm delay circuit required for the conventional apparatus can be omitted from the structure. Therefore, the cost of the abnormal condition detecting apparatus can be reduced and the structure of the same can be simplified.

The abnormal condition detecting apparatus according to the present invention has the structure that the maximum speed of the vehicle is limited or the drive of the vehicle is inhibited if an abnormal condition is detected. Therefore, safety drive of the vehicle is enabled. In a case where the vehicle is stopped, drive of the vehicle is inhibited. As a result, even if the hydraulic brake boosting system is in an abnormal state, safety can be maintained.

What is claimed is:

1. An abnormal condition detecting apparatus for a hydraulic brake boosting system arranged such that hydraulic pressure in an accumulator accumulated by a pump is used to boost the operation of a brake operation member so as to generate braking force, said apparatus comprising:

pressure-gradient calculating means for calculating a gradient of the pressure rise which is changed in the rise in pressure discharged from a pump or hydraulic pressure in an accumulator in a predetermined time during the operation of the pump; and alarm-signal generating means for transmitting, to an alarm unit, an alarm signal when the gradient of the pressure rise is smaller than a predetermined set value, wherein when the gradient of the pressure rise in the pressure discharged from the pump is smaller than the set value during the operation of the pump, a determination is made that an abnormal condition has been encountered, and wherein said determination of an abnormal condition is inhibited during a braking operation.

2. An abnormal condition detecting apparatus for a hydraulic brake boosting system arranged such that hydraulic pressure in an accumulator accumulated by a pump is used to boost the operation of a brake operating member so as to generate braking force, said apparatus comprising:

pressure-gradient calculating means for calculating a gradient of the pressure depression which is changed in the depression of hydraulic pressure in an accumulator in a predetermined time after the operation of the pump has been interrupted; and alarm-signal generating means for transmitting, to an alarm unit, an alarm signal when the gradient of the pressure depression is larger than a predetermined set value, wherein when the gradient of the pressure depression of the pressure discharged from the pump is larger than the set value after the operation of the pump has been interrupted, a determination is made that an abnormal condition has been encountered and wherein said determination of an abnormal condition is inhibited during a braking operation.

3. An abnormal condition detecting apparatus for a hydraulic brake boosting system arranged such that hydraulic pressure in an accumulator accumulated by a pump is used to boost the operation of a brake operating member so as to generate braking force, said apparatus comprising:

pressure-gradient calculating means for calculating a gradient of the pressure rise which is changed in the rise in pressure discharged from a pump or hydraulic pressure in an accumulator in a predetermined time during the operation of the pump; and alarm-signal generating means for transmitting, to an alarm unit, an alarm signal when the gradient of the pressure rise is smaller than a predetermined first set value or when the gradient of the pressure depression is larger than a predetermined second set value during the operation of the pump, wherein when the gradient of the pressure rise of the pressure discharged from the pump or the hydraulic pressure in the accumulator is smaller than the first set value during the operation of the pump or when the gradient of the pressure depression of the hydraulic pressure in the accumulator after the operation of the pump has been interrupted is larger than the second set value, a determination is made that an abnormal condition has been encountered, and wherein said determination of an abnormal condition is inhibited during a braking operation.

4. An abnormal condition detecting apparatus for a hydraulic brake boosting system arranged such that hydraulic pressure in an accumulator accumulated by a pump is used to boost the operation of a brake operating member so as to generate braking force, said apparatus comprising:

pressure-gradient calculating means for calculating a gradient of the pressure rise which is changed in the rise in pressure discharged from a pump or hydraulic pressure in an accumulator in a predetermined time during the operation of the pump; and alarm-signal generating means for transmitting, to an alarm unit, an alarm signal when the gradient of the pressure rise is larger than a predetermined set value, wherein when the gradient of the pressure rise in the pressure discharged from the pump is larger than the set value during the operation of the pump, a determination is made that an abnormal condition has been encountered, and wherein said determination of an abnormal condition is inhibited during a braking operation.

5. An abnormal condition detecting apparatus according to any one of claims 1 to 4 further comprising means for counting the number of encounters of said abnormal condition.

6. An abnormal condition detecting apparatus according to any one of claims 1 to 4, wherein the braking operation is detected in response to an ON signal of a brake switch, a rapid change signal of the hydraulic pressure in the accumulator supplied from pressure detecting means, or a traction-control operation signal generated when the braking operation is performed.

7. An abnormal condition detecting apparatus according to any one of claims 1 to 4, wherein when the voltage of a motor for operating the pump is not higher than a predetermined voltage level, determination of an abnormal condition is inhibited.

8. An abnormal condition detecting apparatus for a hydraulic brake boosting system according to any one of claims 1 to 4, wherein determination of an abnormal condition is made by operating the pump at predetermined time intervals when an ignition switch is being switched on.

9. An abnormal condition detecting apparatus for a hydraulic brake boosting system according to any one of claims 1 to 4, wherein when the pressure discharged from the pump is higher than a predetermined set level, determination of an abnormal condition is inhibited.

10. An abnormal condition detecting apparatus for a hydraulic brake boosting system according to any one of claims 1 to 4, wherein the set value is changed in accordance with the voltage of a motor for operating the pump.

11. An Abnormal condition detecting apparatus for a hydraulic brake boosting system according to any one of claims 1 to 4, further comprising driving-speed-control-signal generating means which produces an output when an abnormal condition has been detected, wherein a maximum speed of a vehicle is limited or driving of the vehicle is inhibited in response to an output signal from said driving-speed-control-signal generating means when an abnormal condition has been detected.

* * * * *